(12) United States Patent
Yamaguchi

(10) Patent No.: US 7,921,545 B2
(45) Date of Patent: Apr. 12, 2011

(54) METHOD FOR SETTING A PLURALITY OF STATOR COILS ON A STATOR CORE

(75) Inventor: Kazuyuki Yamaguchi, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 789 days.

(21) Appl. No.: 11/801,886

(22) Filed: May 11, 2007

(65) Prior Publication Data

US 2007/0261230 A1 Nov. 15, 2007

(30) Foreign Application Priority Data

May 11, 2006 (JP) .................................. 2006-132973

(51) Int. Cl.
*H01F 7/06* (2006.01)

(52) U.S. Cl. ............ 29/606; 29/596; 29/602.1; 29/605; 310/179; 310/184; 310/208

(58) Field of Classification Search .................. 29/592.1, 29/596, 602.1, 605, 606; 310/179, 184, 208
See application file for complete search history.

(56) References Cited

U.S. PATENT DOCUMENTS

| 4,186,478 A | * | 2/1980 | Hamane et al. ................. 29/596 |
| 4,307,311 A | * | 12/1981 | Grozinger ..................... 310/179 |
| 4,741,098 A | * | 5/1988 | Barrera ........................... 29/736 |
| 6,249,956 B1 | * | 6/2001 | Maeda et al. ................... 29/596 |

FOREIGN PATENT DOCUMENTS

| JP | 3448204 | 7/2003 |
| JP | 2005-080356 | 3/2005 |
| JP | 2005-184887 | 7/2005 |

* cited by examiner

*Primary Examiner* — Paul D Kim
(74) *Attorney, Agent, or Firm* — Locke Lord Bissell & Liddell LLP

(57) ABSTRACT

Stator coils are retained by an inserting blade and a setting blade. The setting blade is rotated in this state. Then, after rotation, the stator coils are set on the inserting blade. At this time, the stator coils are arranged in the inserting blade in a state where the stator coils overlap one another to form a spiral shape. Thus, the stator coils are arranged uniformly.

5 Claims, 21 Drawing Sheets

METHOD FOR SETTING A PLURALITY OF STATOR COILS ON A STATOR CORE

BACKGROUND OF THE INVENTION

The present invention relates to a method and an apparatus for setting a stator coil on a blade of an inserter, and to a method for manufacturing a rotating electrical machine including a stator core about which stator coils are wound.

A stator used for a rotating electrical machine such as an electric motor and a generator has a stator core including teeth. Stator coils are inserted in slots formed between the teeth. Japanese Patent No. 3448204 and Japanese Laid-Open Patent Publication No. 2005-184887 disclose methods for winding stator coils. In these methods, the stator coils are wound around a stator core such that each stator coil extends over a number of teeth. The stator coils overlap one another to form a spiral shape as a whole.

Japanese Laid-Open Patent Publication No. 2005-80356 discloses a method for inserting stator coils in slots of a stator core using an inserter.

In a case where the stator coils are inserted in the slots of the stator core using the inserter, the stator coils that are formed into a predetermined shape in advance need to be set on a blade of the inserter. In order to apply the above inserter to the methods disclosed in Japanese Patent No. 3448204 and Japanese Laid-Open Patent Publication No. 2005-184887, it is necessary to set, on the blade, the stator coils that are formed into a shape that permits the stator coils to overlap one another to form a spiral shape when inserted in the slots of the stator core. However, in the conventional methods, since the stator coils are manually formed, the arrangement of the stator coils inserted in the slots tends to be uneven. In particular, unevenness in the arrangement is significant at the region where the stator coil that is set on the blade first overlaps the stator coil that is set on the blade last. This reduces the efficiency of the rotating electrical machine.

SUMMARY OF THE INVENTION

Accordingly, it is an objective of the present invention to evenly arrange stator coils when the stator coils are mounted on a stator core using an inserter in a state where the stator coils overlap one another to form a spiral shape.

To achieve the foregoing objective, and in accordance with a first aspect of the present invention, a method for setting a plurality of stator coils on an inserting blade before mounting the stator coils on a stator core using the inserting blade such that the stator coils overlap one another to form a spiral shape is provided. The method includes: retaining a first section of each stator coil by a first member while retaining a second section of each stator coil by a second member, thereby arranging the stator coils about an axis at equal intervals to extend in a radial pattern; rotating the first member or the second member about the axis to generate a phase difference between the first section and the second section of each stator coil; and setting the stator coils on the inserting blade while maintaining the phase difference between the first section and the second section.

In accordance with a second aspect of the present invention, an apparatus for setting a plurality of stator coils on an inserting blade before mounting the stator coils on a stator core using the inserting blade such that the stator coils overlap one another to form a spiral shape is provided. The inserting blade selectively retains a first section and a second section of each stator coil. The apparatus includes a mounting portion on which the inserting blade is mounted, a retainer, which selectively retains the first section or the second section of each stator coil, and a rotating and moving mechanism. One of the first section and the second section of each stator coil is retained by the inserting blade while the other is retained by the retainer such that the stator coils are arranged about an axis at equal intervals to extend in a radial pattern. The rotating and moving mechanism rotates the inserting blade or the retainer about the axis to generate a phase difference between the first section and the second section of each stator coil, and moves part of the stator coils retained by the retainer to the inserting blade while maintaining the phase difference.

In accordance with a third aspect of the present invention, a method for manufacturing a rotating electrical machine is provided. The rotating electrical machine includes a stator core on which a plurality of stator coils are mounted in a state where the stator coils overlap one another to form a spiral shape as a whole. The method includes: retaining a first section of each stator coil by a first member while retaining a second section of each stator coil by a second member, thereby arranging the stator coils about an axis at equal intervals to extend in a radial pattern; rotating the first member or the second member about the axis to generate a phase difference between the first section and the second section of each stator coil; setting the stator coils on the inserting blade while maintaining the phase difference between the first section and the second section; and inserting the stator coils set on the inserting blade in slots formed in the stator core.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to FIGS. 1 to 5B.

Figure 1:
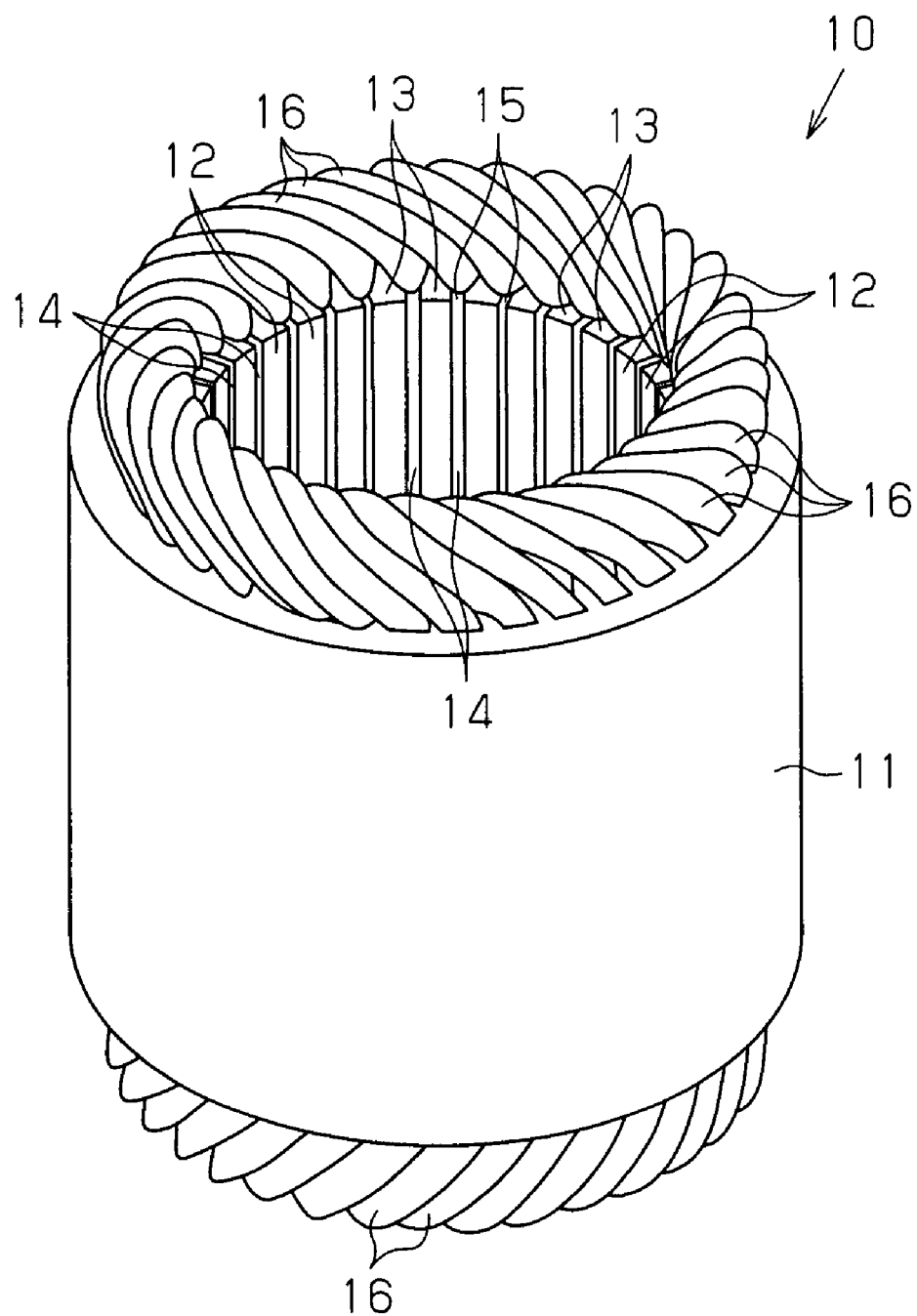
FIG. 1 is a perspective view illustrating a stator in a state where stator coils are mounted on a stator core.

FIG. 1 shows a stator 10 used in a rotating electrical machine such as an electric motor and a generator. Teeth 12, which project radially inward, are formed on the inner circumferential portion of a stator core 11. The teeth 12 are arranged at equal pitches in the circumferential direction of the stator core 11. Each tooth 12 is T-shaped, and includes a distal end portion on which protrusions 13 are formed. The protrusions 13 extend in the opposite directions from each other in the circumferential direction. Between each tooth 12 and the adjacent one of the teeth 12 is defined a slot 14, which extends in the axial direction of the stator core 11. An opening portion 15 of each slot 14 is defined between the distal end portions of the two adjacent teeth 12.

Stator coils 16 are mounted on the stator core 11. Each stator coil 16 is formed into an annular shape by winding a conductive wire. Each stator coil 16 is mounted on the stator core 11 so as to extend over a predetermined number of teeth 12. Each stator coil 16 includes an inner section, which extends along a radially inward section of the stator core 11, and an outer section, which extends along a radially outward section of the stator core 11. The inner section of each stator coil 16 is arranged between the distal end portions of the adjacent teeth 12, that is, in the vicinity of the corresponding opening portion 15. The outer section of each stator coil 16 is arranged at the inner most portion of the corresponding slot 14. Each stator coil 16 bulges from the inner section toward the outer section, and closely contacts the adjacent stator coil 16. Thus, the stator coils 16 are mounted on the stator core 11 such that the stator coils 16 overlap one another to form a spiral shape as a whole.

The stator coils 16 are inserted in the slots 14 using an inserter apparatus to be mounted on the stator core 11. The stator coils 16 are set on an inserting blade 17 (shown in FIG. 2, etc.) of the inserter, and are inserted in the slots 14 via the inserting blade 17.

A procedure for setting the stator coils 16 on the inserting blade 17 will now be described with reference to FIGS. 2A to 4B. In embodiments of the present invention, to complete setting of the stator coils 16 on the inserting blade 17, three types of members are used that are classified by functions. That is, a first member, which is an initial member in the embodiments, and second members, which are an intermediate member and a final member in the embodiments, are used. The initial member functions as a member on which the stator coils 16 are set first. The intermediate member functions as a member for retaining one of first and second sections (which will be described below) of the stator coils 16 set on the initial member. The final member functions as a member on which the stator coils 16 are set after one of the initial member and the intermediate member is rotated.

In the procedure shown in FIGS. 2A to 4B, an inserting blade 17, which functions as the intermediate member and the final member, and a setting blade 18 and a rotating blade 19, which function as the initial members, are used. The stator coils 16 are twisted by the inserting blade 17, the setting blade 18, and the rotating blade 19, and are finally set on the inserting blade 17.

The inserting blade 17 is cylindrical and includes a circumferential surface on which slits 20 are formed. The slits 20 are arranged at equal pitches in the circumferential direction of the inserting blade 17, and extend in the axial direction of the inserting blade 17. The arrangement pitch of the slits 20 corresponds to the arrangement pitch of the teeth 12 of the stator core 11. The setting blade 18 is cylindrical and includes an outer diameter that is equal to the outer diameter of the inserting blade 17. The setting blade 18 includes a circumferential surface on which slits 21 are formed. The slits 21 are arranged at equal pitches in the circumferential direction of the setting blade 18, and extend in the axial direction of the setting blade 18. The rotating blade 19 includes a circular insertion section 22 through which the inserting blade 17 and the setting blade 18 are inserted. The rotating blade 19 is movable in the axial direction of the setting blade 18 and rotatable about the axis of the setting blade 18.

Figure 2A:
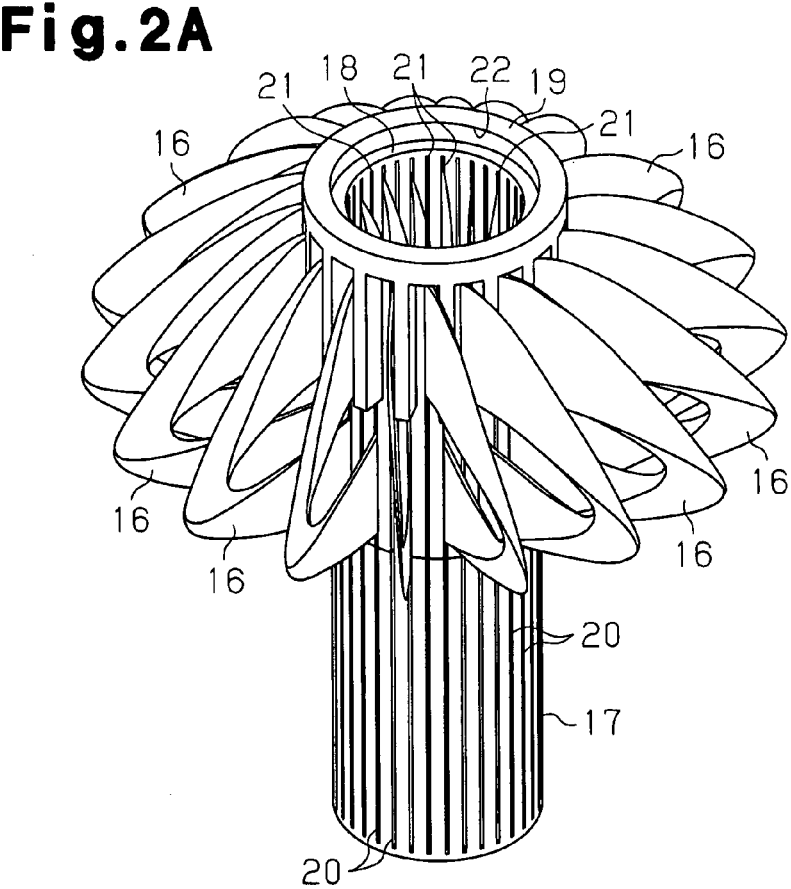
FIG. 2A is a schematic diagram illustrating a state where the stator coils are set on a setting blade according to a first embodiment.

First, the stator coils 16 are set on the setting blade 18 inserted in the insertion section 22 of the rotating blade 19 as shown in FIG. 2A. Each stator coil 16 is set on the setting blade 18 so as to extend over two adjacent slits 21. That is, each stator coil 16 includes a first section, which is inserted in one of the two adjacent slits 21 and a second section, which is inserted in the other slit 21. In this initial setting state, the first section and the second section of each stator coil 16 are displaced from each other in the circumferential direction of the setting blade 18 by an amount corresponding to the arrangement pitch of the slits 21, and in the axial direction of the setting blade 18 (see FIG. 2A). The distance between the adjacent stator coils 16 is equal to the distance between other adjacent stator coils 16. The stator coils 16 are arranged in the circumferential direction of the setting blade 18 to extend in a radial pattern. That is, the stator coils 16 are arranged about an axis of the setting blade 18 at equal intervals to extend in a radial pattern.

Subsequently, the inserting blade 17 is arranged on the setting blade 18 on which the stator coils 16 are set. Each of the slits 21 of the setting blade 18 is aligned with one of the slits 20 of the inserting blade 17 in the circumferential direction.

Figure 2B:
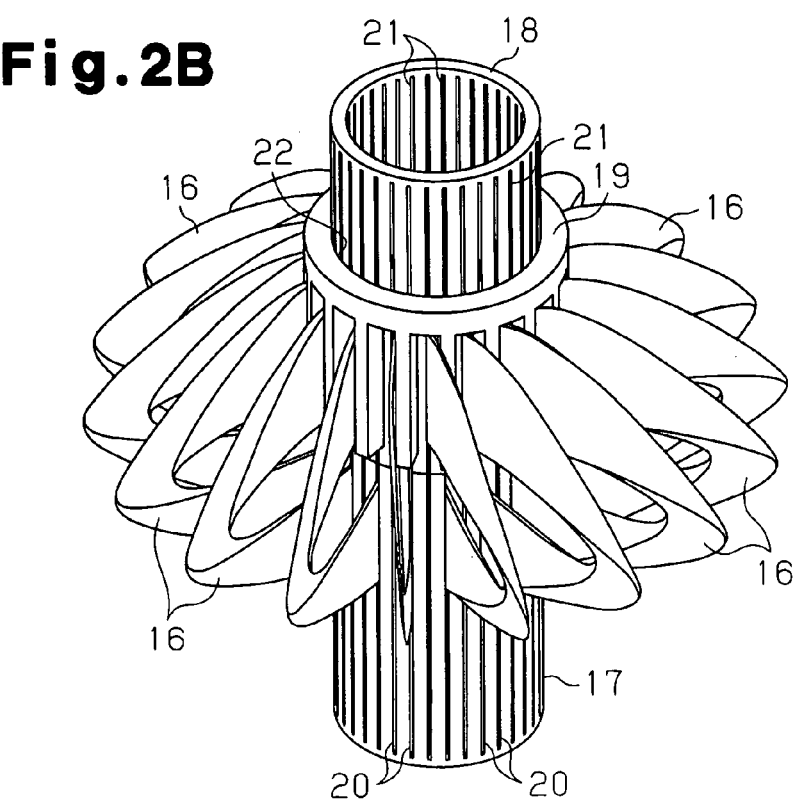
FIG. 2B is a schematic diagram illustrating a state where a second section of each stator coil is inserted in an inserting blade according to the first embodiment.

Then, as shown in FIG. 2B, while moving the rotating blade 19 toward the inserting blade 17, the second section of each stator coil 16 is moved from the associated slit 21 toward the slit 20 of the inserting blade 17 corresponding to the slit 21, and is inserted in the slit 20. In this state, the second section of each stator coil 16 is inserted in one of the slits 20 of the inserting blade 17, and the first section of each stator coil 16 is inserted in one of the slits 21 of the setting blade 18. That is, the stator coils 16 are retained by both the inserting blade 17 and the setting blade 18.

Subsequently, the rotating blade 19 and the setting blade 18 are rotated in one direction by an amount corresponding to a necessary pitch (clockwise in FIG. 3A). The necessary pitch corresponds to the number of the teeth 12 around which each stator coil 16 is to be wound when being mounting on the stator core 11, that is, the distance between two slots 14 in which each stator coil 16 is inserted. The necessary pitch is determined in accordance with the specification of the electric motor or the rotary machine. The pitch is determined in accordance with the rotating amount by which the rotating blade 19 needs to be rotated to make the stator coils 16 overlap one another.

Figure 3A:
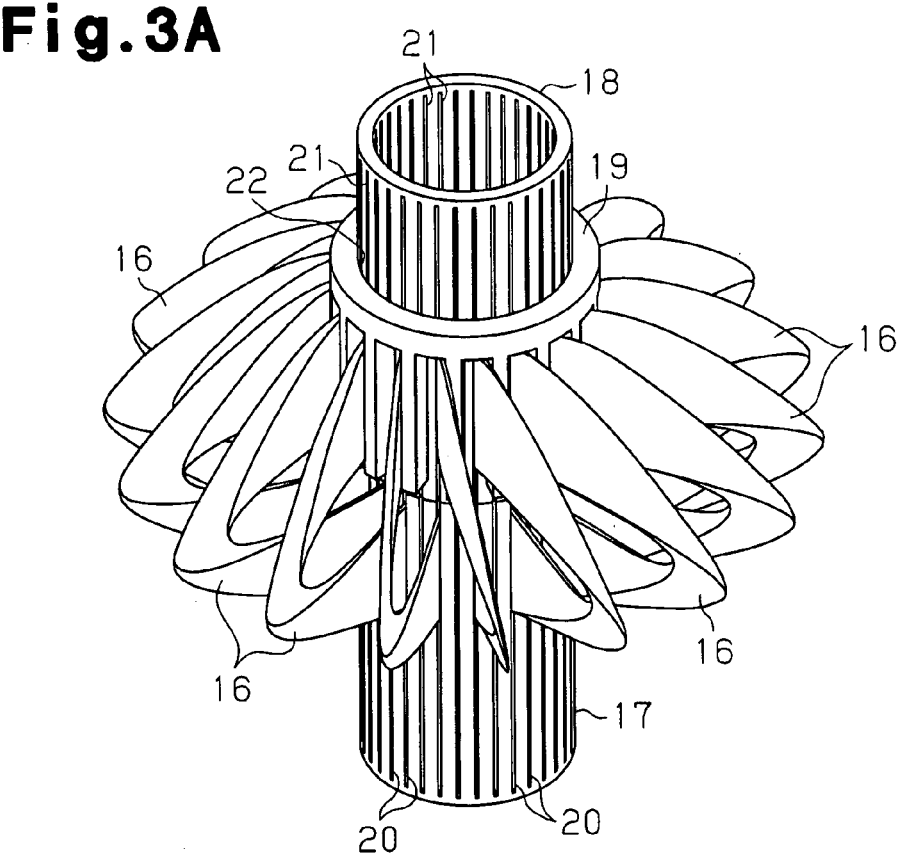
FIGS. 3A and 3B are schematic diagrams illustrating a state where the setting blade is rotated according to the first embodiment.

FIG. 3A shows the state where the rotating blade 19 and the setting blade 18 are rotated by one pitch from the state shown in FIG. 2B. Accordingly, the first section of each stator coil 16 inserted in the slit 21 of the setting blade 18 is displaced from the second section of each stator coil 16 inserted in the slit 20 of the inserting blade 17 by a pitch corresponding to the rotation. That is, the first section and the second section of each stator coil 16 are displaced from each other in the circumferential direction, and a phase difference (positional displacement) is generated between the first section and the second section. When the rotating blade 19 is rotated, all the stator coils 16 are simultaneously rotated by the same pitches.

Figure 3B:
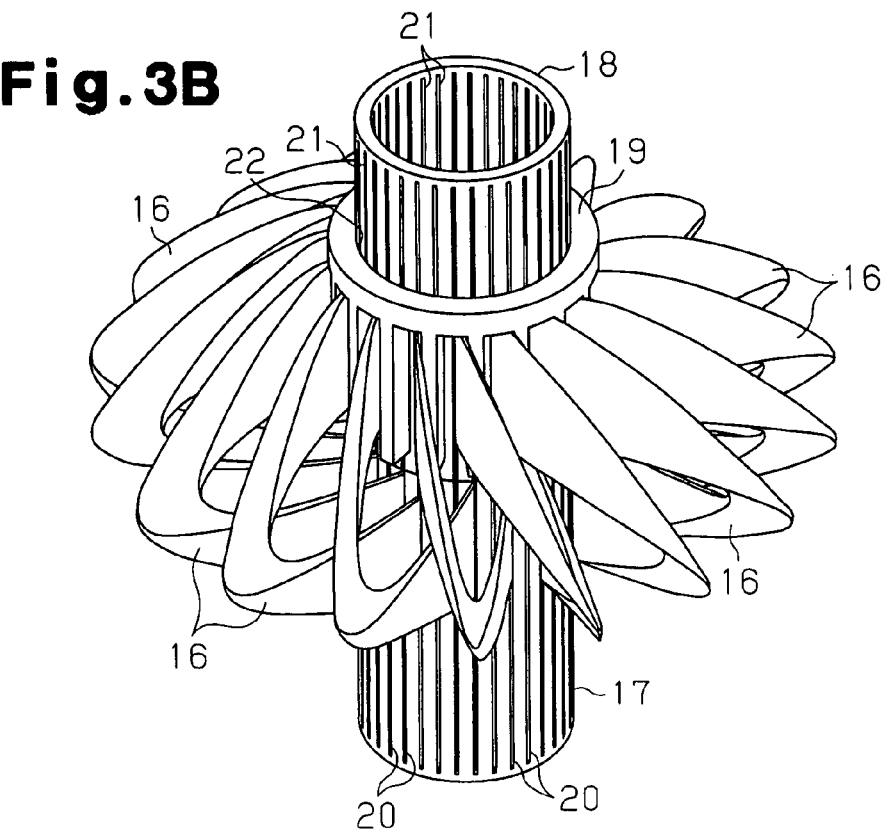

FIG. 3B shows a state where the rotating blade 19 and the setting blade 18 are rotated by four pitches. Each stator coil 16 is changed into a state where the first section is displaced from the second section by four pitches from the state before being rotated as shown in FIG. 2B. That is, each stator coil 16 is brought into a state where the first section and the second section are displaced from each other by five pitches, which include the displacement corresponding to one pitch generated between the first section and the second section when being initially set on the setting blade 18.

Figure 4A:
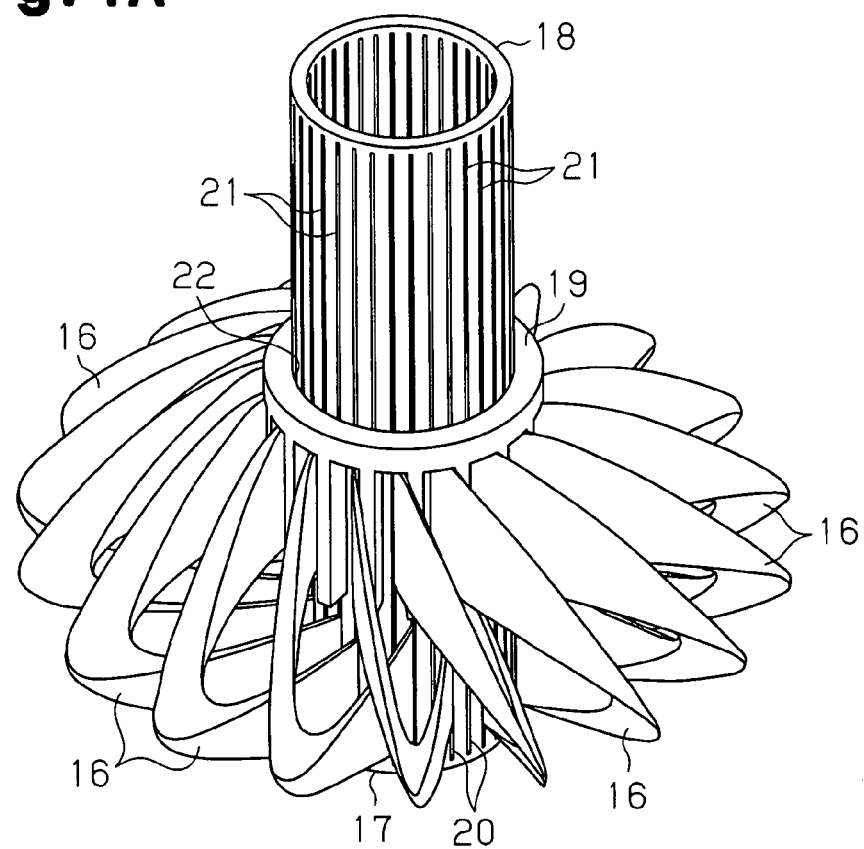
FIG. 4A is a schematic diagram illustrating a state where a first section of each stator coil is inserted in the inserting blade according to the first embodiment.

Then, as shown in FIG. 4A, the rotating blade 19 is further moved toward the inserting blade 17. Thus, the first section of each stator coil 16 inserted in the associated slit 21 of the setting blade 18 is moved toward the corresponding slit 20 of the inserting blade 17, and is inserted in the slit 20. The first section of each stator coil 16 is inserted in the slit 20 of the inserting blade 17 located at a position displaced by four pitches from the state before being rotated as shown in FIG. 2B.

Figure 4B:
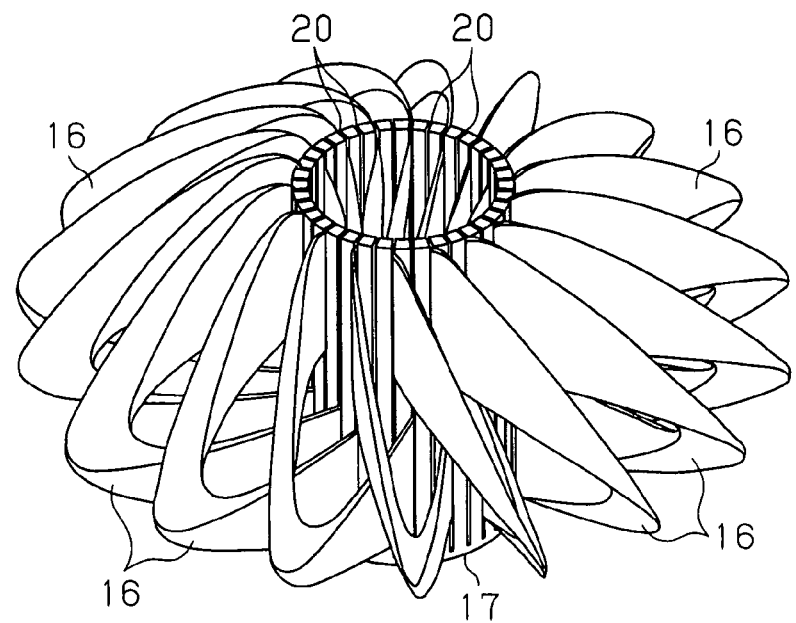
FIG. 4B is a schematic diagram illustrating a state where the setting blade is removed from the inserting blade according to the first embodiment.

Thereafter, as shown in FIG. 4B, the setting blade 18 and the rotating blade 19 are removed from the inserting blade 17. As a result, each stator coil 16 is set on the inserting blade 17 with the second section displaced from the first section by five pitches. The stator coils 16 are arranged to overlap one another to form a spiral shape as a whole in the same manner as when being mounted on the stator core 11. Then, the inserting blade 17 on which the stator coils 16 are mounted is set on the inserter, and each stator coil 16 is inserted in the stator core 11. As a result, as shown in FIG. 1, the stator coils 16 are mounted on the stator core 11 in a state where the stator coils 16 overlap one another to form a spiral shape as a whole. The inserter includes, for example, one that employs a method of extruding the stator coils 16 set on the inserting blade 17 by a mechanical configuration and inserting the stator coils 16 in the slots 14 of the stator core 11, or one that employs a method of extruding the stator coils 16 by an electrical configuration and inserting the stator coils 16 in the slots 14.

In the first embodiment, since the stator coils 16 are rotated while the stator coils 16 are retained by the initial member and the intermediate member, the stator coils 16 are simultaneously and uniformly twisted. The stator coils 16 are finally set on the inserting blade 17 in the same manner. Thus, when the stator coils 16 are inserted in the stator core 11 from the inserting blade 17, the stator coils 16 are uniformly arranged on the stator core 11 in a state where the stator coils 16 overlap one another to form a spiral shape.

Figure 5B:
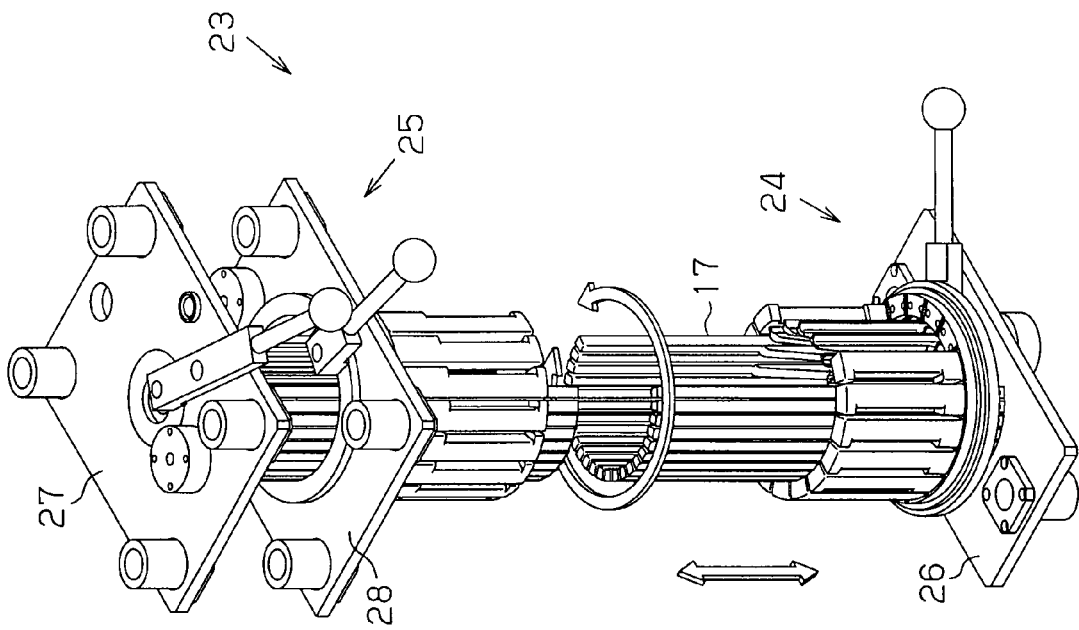
FIGS. 5A and 5B are schematic diagrams illustrating a setting apparatus for the stator coils.
Figure 5A:
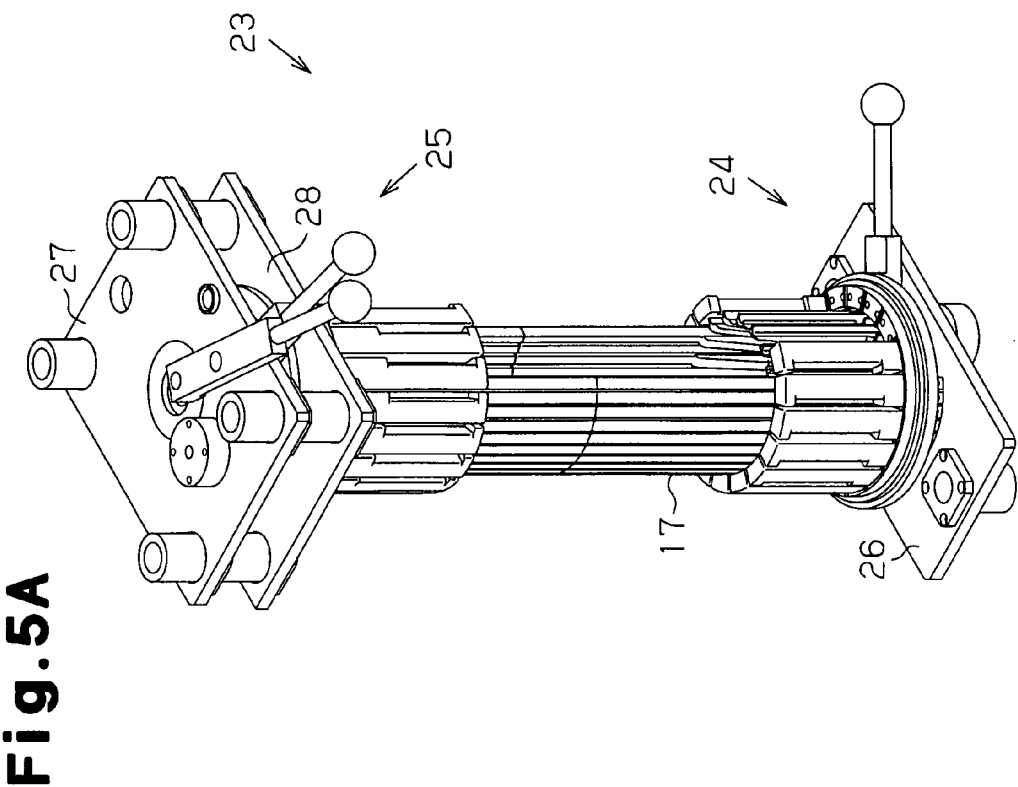

FIGS. 5A and 5B schematically show a setting apparatus 23 for the stator coils 16 for executing the procedure described in FIGS. 2A to 4B.

The setting apparatus 23 includes a stationary part 24 and a movable part 25. The stationary part 24 includes a mounting portion, which is a base 26 in the first embodiment, on which the inserting blade 17 is mounted. The movable part 25 includes a first operating mechanism 27 and a second operating mechanism 28. The setting blade 18 is mounted on the first operating mechanism 27. The first operating mechanism 27 reciprocates the setting blade 18 in the axial direction (a direction in which the setting blade 18 approaches and separates from the inserting blade 17). The rotating blade 19 is mounted on the second operating mechanism 28. The second operating mechanism 28 functions as a rotating and moving mechanism, and reciprocates the rotating blade 19 in the axial direction of the setting blade 18 and rotates the rotating blade 19 and the setting blade 18. In the first embodiment, the setting blade 18 and the rotating blade 19 configure a retainer.

The stator coils 16 are moved along the axial direction of the inserting blade 17 and the setting blade 18 between the blades 17 and 18 by the setting apparatus 23 in accordance with the above mentioned procedure, and are rotated in the circumferential direction of the blades 17, 18. Finally, the stator coils 16 are set on the inserting blade 17 in a state where the stator coils 16 overlap one another to form a spiral shape.

The first embodiment has the following advantages.

(1) Each stator coil 16 is rotated with the first section retained by the setting blade 18 and the second section retained by the inserting blade 17. Thus, a phase difference (positional displacement) is generated between the first section and the second section. The stator coils 16 are rotated simultaneously by the same pitches. Thus, after rotation, the stator coils 16 set on the inserting blade 17 overlap one another to form a uniform spiral shape. Therefore, the stator coils 16 are uniformly mounted on the stator core 11 using the inserter.

(2) Since the stator coils 16 are uniformly arranged on the inserting blade 17, the stator coils 16 are smoothly mounted on the stator core 11. As a result, decrease in the efficiency of the rotating electrical machine is suppressed.

(3) The stator coils 16 are simultaneously rotated. Thus, by adjusting the rotating amount of the stator coils 16, a stator corresponding to the specification of the rotating electrical machine is easily manufactured. Furthermore, regardless of the specification of the rotating electrical machine, the stator coils 16 are uniformly arranged on the stator core 11.

(4) The stator coils 16 are formed by utilizing the inserting blade 17, which functions as the intermediate member and the final member. Thus, the number of members required for forming the stator coils 16 is minimized, which simplifies the forming procedure.

A second embodiment will now be described with reference to FIGS. 6A to 8B. In the second embodiment described below, like or the same reference numerals are given to those components that are like or the same as the corresponding components of the first embodiment and detailed explanations are omitted or simplified.

In the second embodiment, the procedure for setting the stator coils 16 on the inserting blade 17 differs from that of the first embodiment. Therefore, the procedure for setting the stator coils 16 on the inserting blade 17 will mainly be discussed below.

In the procedure shown in FIGS. 6A to 8B, the inserting blade 17, which functions as the initial member and the final member, and a setting jig 30, which functions as the intermediate member, are used. The stator coils 16 are twisted by the inserting blade 17 and the setting jig 30, and are finally set on the inserting blade 17.

The setting jig 30 is cylindrical and has the same outer diameter as the inserting blade 17. Slits 31 are formed on the circumferential surface of the setting jig 30. The slits 31 are arranged at equal pitches in the circumferential direction of the setting jig 30, and extend in the axial direction of the setting jig 30. The arrangement pitch of the slits 31 corresponds to two pitches of the slits 20 of the inserting blade 17.

Figure 6A:
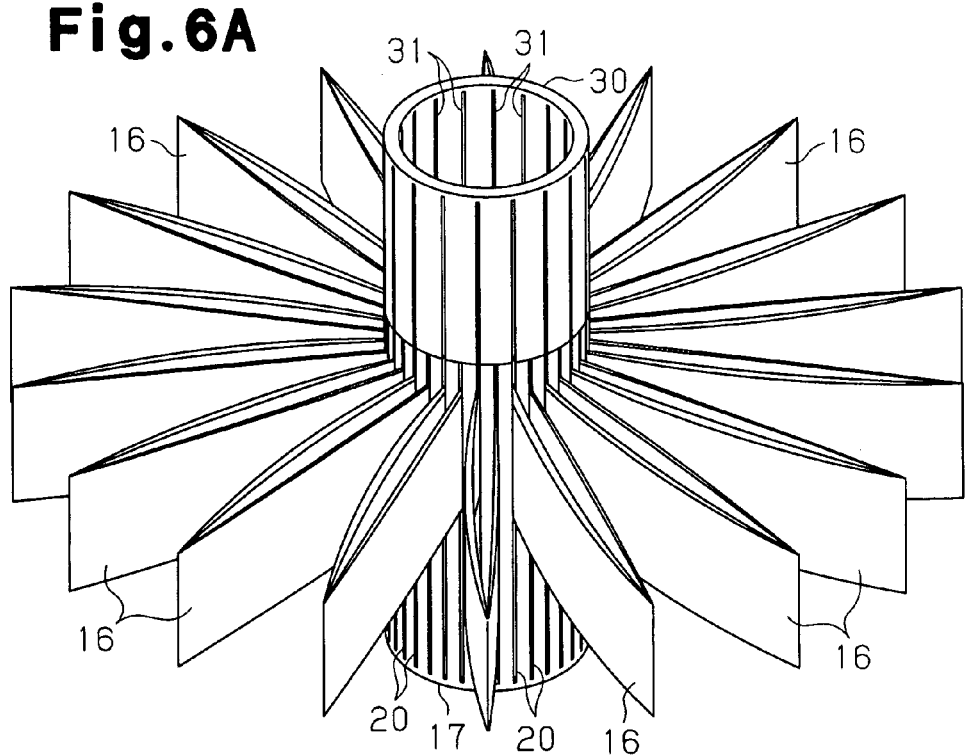
FIG. 6A is a schematic diagram illustrating a state where the stator coils are set on the inserting blade according to a second embodiment.

First, the stator coils 16 are set on the inserting blade 17 as shown in FIG. 6A. Each stator coil 16 is set on the inserting blade 17 so as to extend over two adjacent slits 20. That is, each stator coil 16 includes a first section, which is inserted in one of the two adjacent slits 20, and a second section, which is inserted in the other slit 20. In this initial setting state, the first section and the second section of each stator coil 16 are displaced from each other in the circumferential direction of the inserting blade 17 by an amount corresponding to the arrangement pitch of the slits 20. The distance between the adjacent stator coils 16 is equal to the distance between other adjacent stator coils 16. The stator coils 16 are arranged in the circumferential direction of the inserting blade 17 to extend in a radial pattern.

Subsequently, the setting jig 30 is arranged on the inserting blade 17 on which the stator coils 16 are set. Each of the slits 31 of the setting jig 30 is aligned with one of the slits 20 of the inserting blade 17 in the circumferential direction.

Figure 6B:
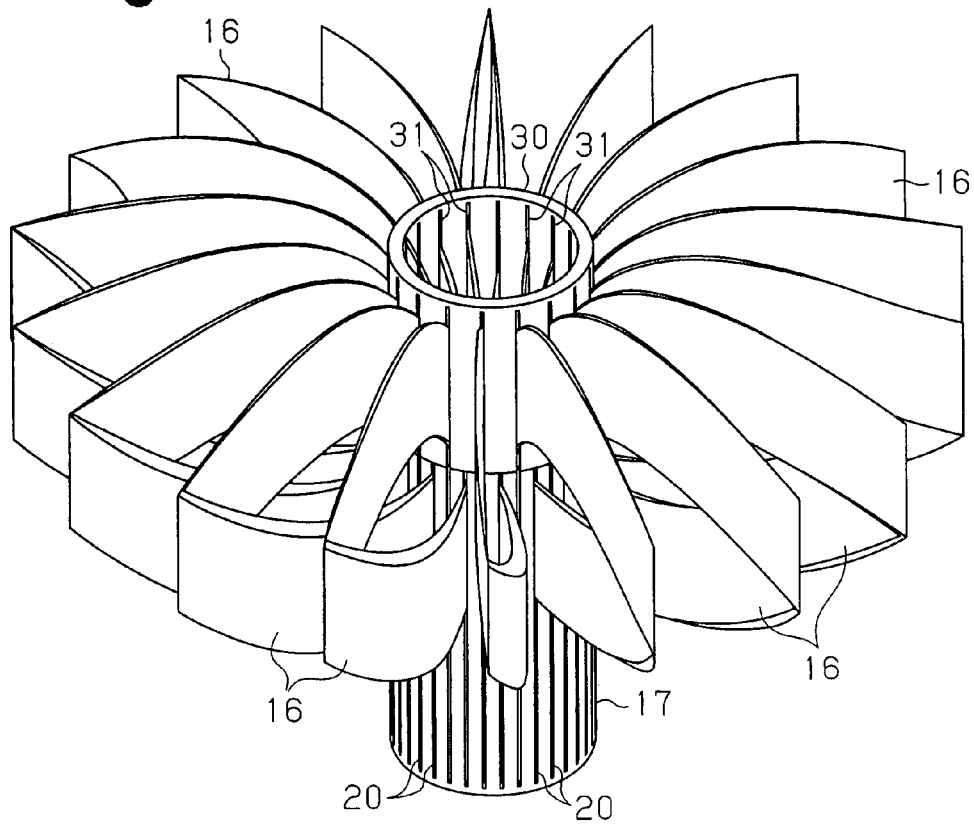
FIG. 6B is a schematic diagram illustrating a state where the second section of each stator coil is inserted in a setting jig according to the second embodiment.

Then, as shown in FIG. 6B, the second section of each stator coil 16 is moved from the associated slit 20 toward the slit 31 of the setting jig 30 corresponding to the slit 20, and is inserted in the slit 31. In this state, the second section of each stator coil 16 is inserted in one of the slits 31 of the setting jig 30, and the first section of each stator coil 16 is inserted in one of the slits 20 of the inserting blade 17. That is, the stator coils 16 are retained by both the inserting blade 17 and the setting jig 30.

Figure 7A:
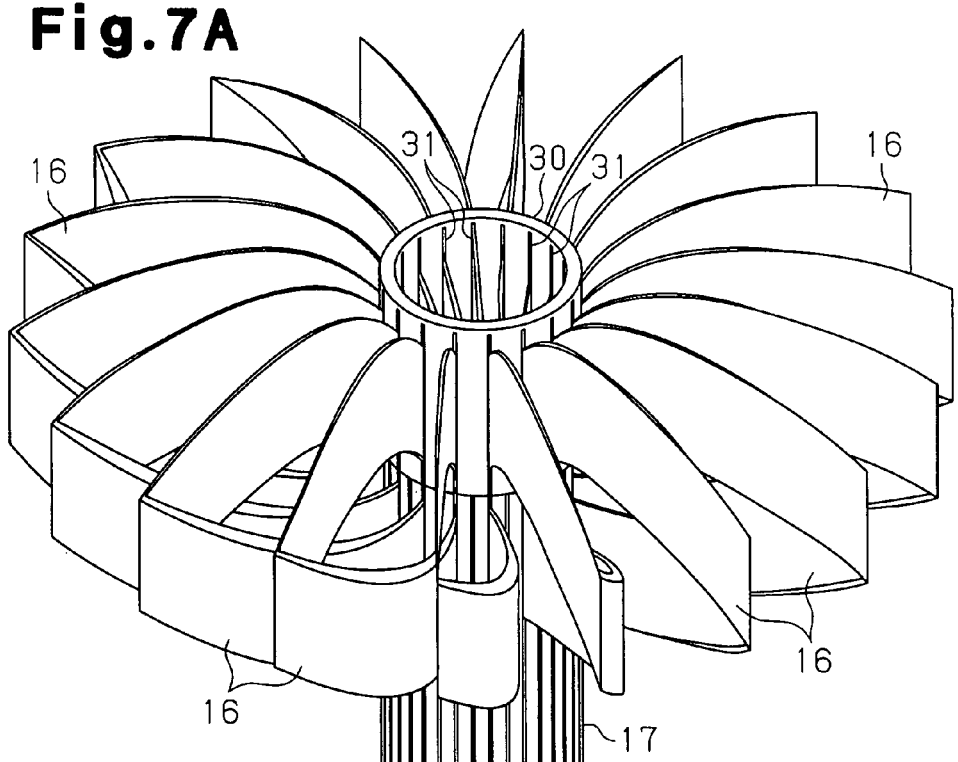
FIGS. 7A and 7B are schematic diagrams illustrating a state where the inserting blade is rotated according to the second embodiment.

Subsequently, the inserting blade 17 is rotated in one direction (counterclockwise in FIG. 7A) by an amount corresponding to a necessary pitch. FIG. 7A shows a state where the inserting blade 17 is rotated by one pitch from the state of FIG. 6B. Accordingly, the second section of each stator coil 16 inserted in the associated slit 31 of the setting jig 30 is displaced from the first section of the stator coil 16 inserted in the associated slit 20 of the inserting blade 17 by a pitch corresponding to the rotation. That is, the first section and the second section of each stator coil 16 are displaced from each other in the circumferential direction, and a phase difference (positional displacement) is generated between the first section and the second section. When the inserting blade 17 is rotated, all the stator coils 16 are simultaneously rotated by the same pitches.

Figure 7B:
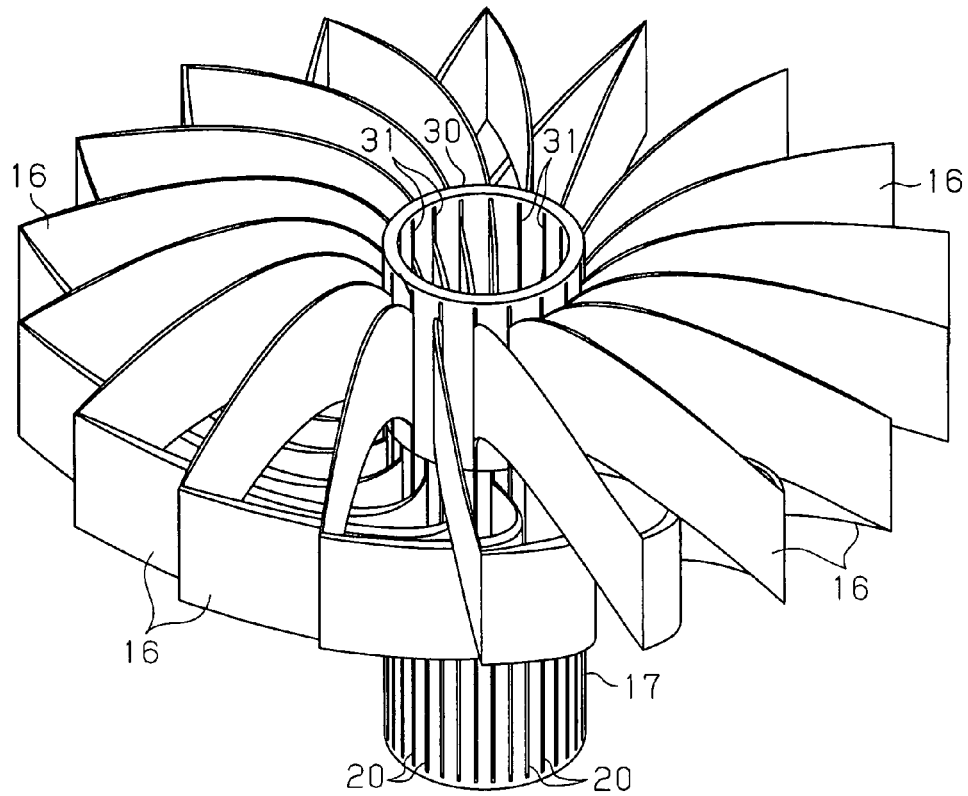

FIG. 7B shows a state where the inserting blade 17 is rotated by four pitches. Each stator coil 16 is changed into a state where the first section is displaced from the second section by four pitches from the state before being rotated as shown FIG. 6B. That is, each stator coil 16 is brought into a state where the first section and the second section are displaced from each other by five pitches, which include the displacement corresponding to one pitch between the first section and the second section when being initially set on the inserting blade 17.

Figure 8A:
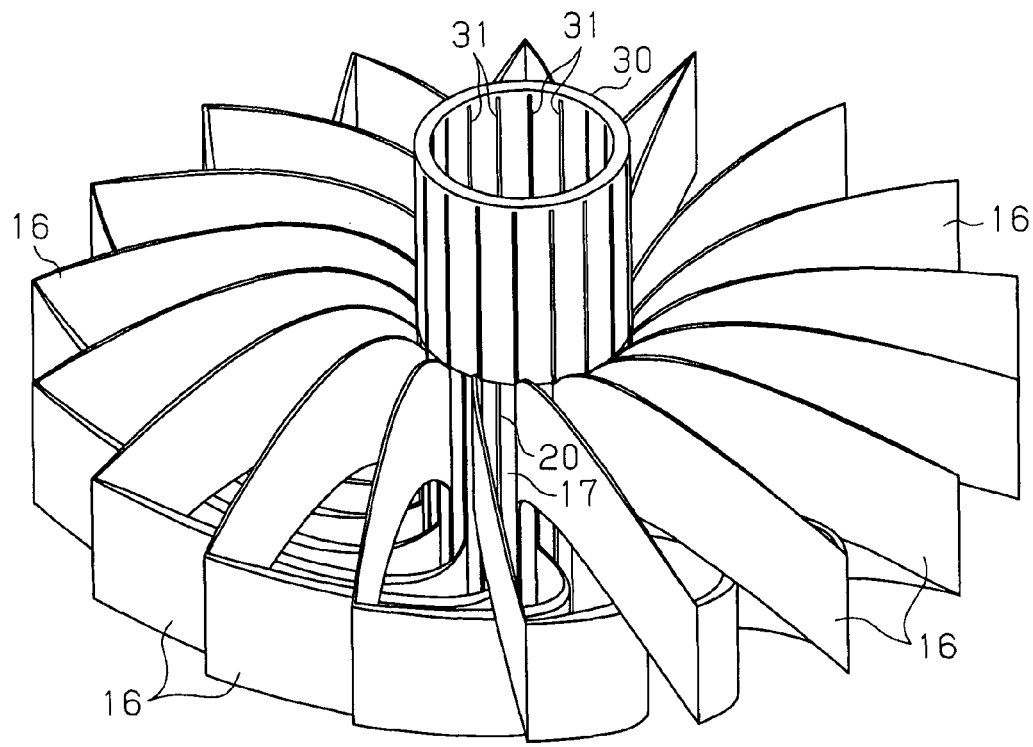
FIG. 8A is a schematic diagram illustrating a state where the second section of each stator coil is inserted in the inserting blade according to the second embodiment.

Then, as shown in FIG. 8A, the second section of each stator coil 16 inserted in the associated slit 31 of the setting jig 30 is moved toward the corresponding slit 20 of the inserting blade 17, and is inserted in the slit 20. The second section of each stator coil 16 is inserted in the slit 20 of the inserting blade 17 located at a position displaced by four pitches from the state before being rotated as shown in FIG. 6B.

Figure 8B:
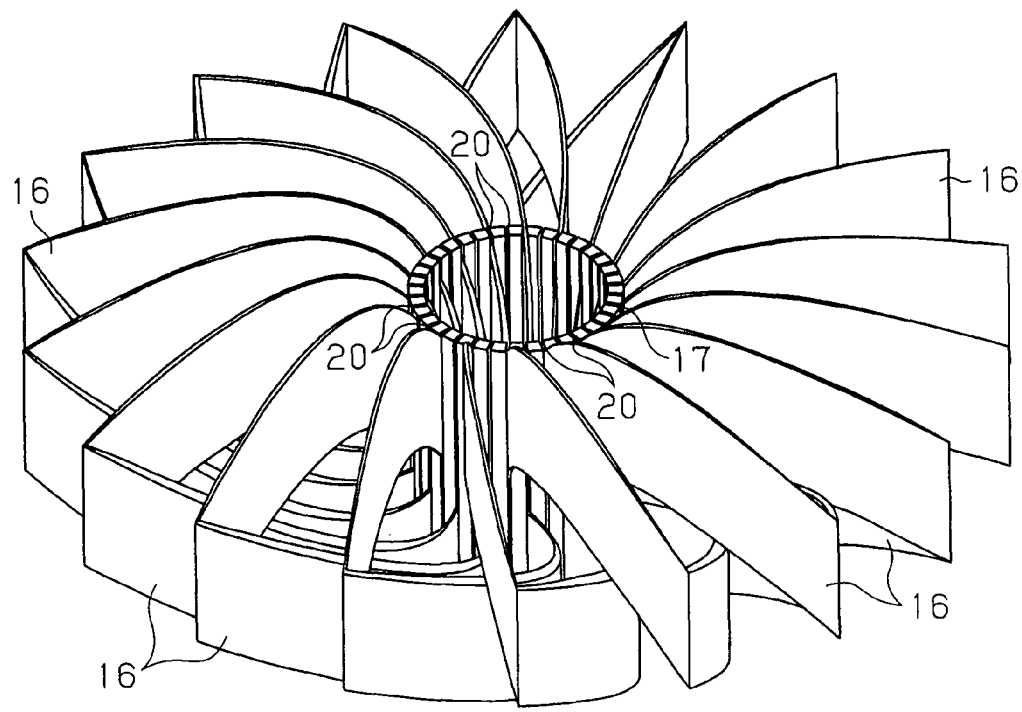
FIG. 8B is a schematic diagram illustrating a state where the setting jig is removed from the inserting blade according to the second embodiment.

Thereafter, as shown in FIG. 8B, the setting jig 30 is removed from the inserting blade 17. As a result, each stator coil 16 is set on the inserting blade 17 with the first section displaced from the second section by five pitches. The stator coils 16 are arranged to overlap one another to form a spiral shape as a whole in the same manner as when being mounted on the stator core 11. Then, the inserting blade 17 on which the stator coils 16 are mounted is set on the inserter, and each stator coil 16 is inserted in the stator core 11. As a result, as shown in FIG. 1, the stator coils 16 are mounted on the stator core 11 in a state where the stator coils 16 overlap one another to form a spiral shape as a whole. The second embodiment has the same advantages as the advantages (1) to (4) of the first embodiment.

A third embodiment will now be described with reference to FIGS. 9 to 13.

In the third embodiment, the procedure for setting the stator coils 16 on the inserting blade 17 differs from that of the first and second embodiments. Therefore, the procedure for setting the stator coils 16 on the inserting blade 17 will mainly be discussed below.

In the procedure shown in FIGS. 9A to 13A, an inner setting jig 32, which functions as the initial member, and an outer setting jig 33, which functions as the intermediate member and the final member, are used. The stator coils 16 are twisted by the inner setting jig 32 and the outer setting jig 33, and are finally set on the inserting blade 17.

The inner setting jig 32 is formed into a disk-like shape. Slits 34 are formed on the inner setting jig 32 and extend in a radial pattern. The slits 34 are arranged at equal pitches in the circumferential direction of the inner setting jig 32, and extend radially outward from the center of the inner setting jig 32. The arrangement pitch of the slits 34 corresponds to the arrangement pitch of the teeth 12 of the stator core 11. The outer setting jig 33 is formed into an annular shape, and includes a circular insertion section 35 located at the center of the outer setting jig 33. The inner setting jig 32 is fitted in the insertion section 35. Slits 36 are formed on the outer setting jig 33 to extend in a radial pattern. The slits 36 are arranged at equal pitches in the circumferential direction of the outer setting jig 33, and extend radially outward from the center of the outer setting jig 33. The arrangement pitch of the slit 36 corresponds to the arrangement pitch of the slits 34 of the inner setting jig 32.

Figure 9A:
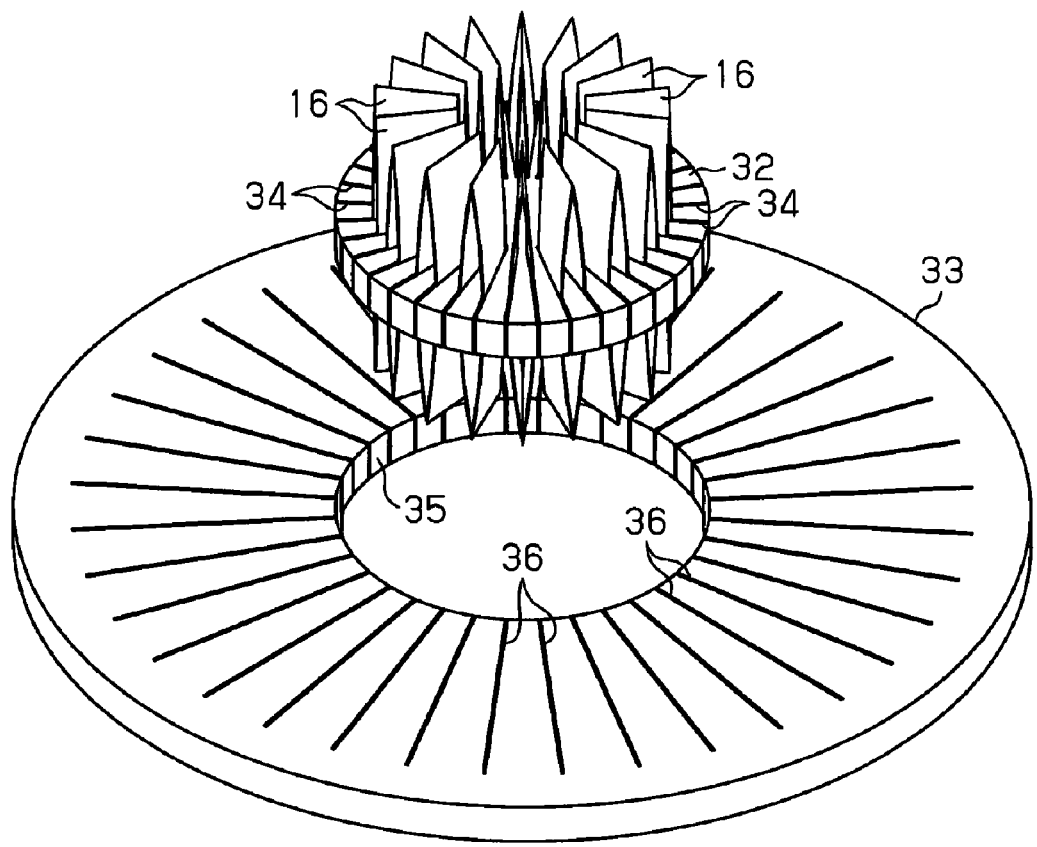
FIG. 9A is a schematic diagram illustrating a state where stator coils are set on an inner setting jig according to a third embodiment.

First, the stator coils 16 are set on the inner setting jig 32 as shown in FIG. 9A. Each stator coil 16 is set so as to extend over two adjacent slits 34. That is, each stator coil 16 includes a first section, which is inserted in one of the two adjacent slits 34, and a second section, which is inserted in the other slit 34. In this initial setting state, the first section and the second section of each stator coil 16 are displaced from each other in the circumferential direction of the inner setting jig 32 by an amount corresponding to the arrangement pitch of the slits 34. The distance between the adjacent stator coils 16 is equal to the distance between other adjacent stator coils 16. The stator coils 16 are arranged in the circumferential direction of the inner setting jig 32 to extend in a radial pattern.

Figure 9B:
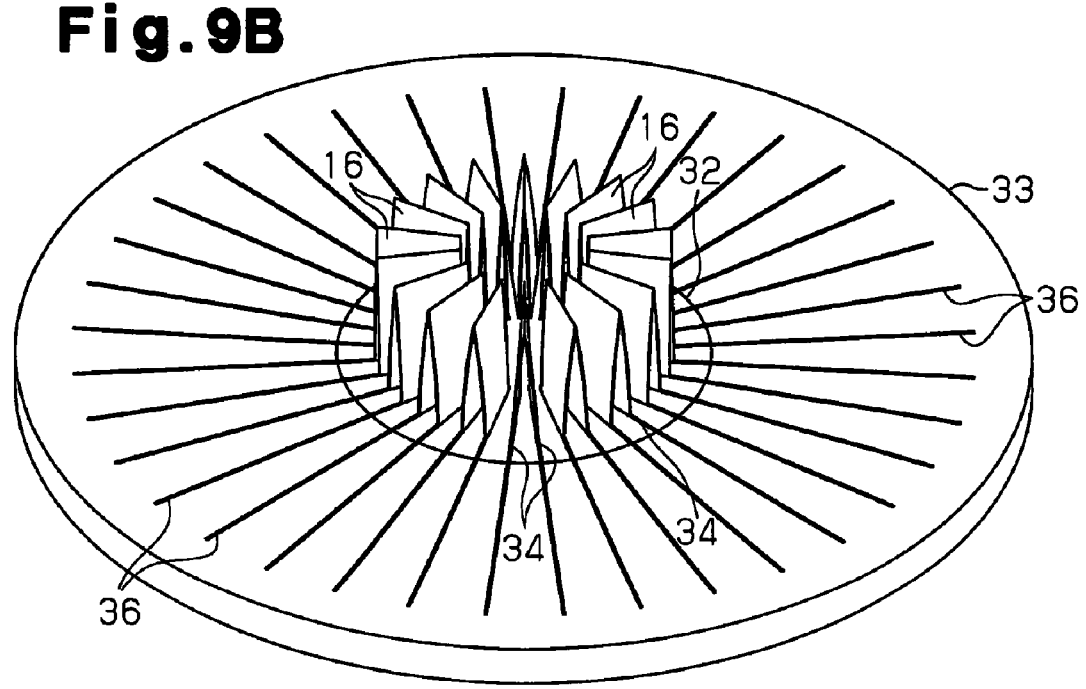
FIG. 9B is a schematic diagram illustrating a state where the inner setting jig is set in an insertion section of an outer setting jig according to the third embodiment.

Subsequently, the inner setting jig 32 on which the stator coils 16 are set is set in the insertion section 35 of the outer setting jig 33 as shown in FIG. 9B. Each of the slits 34 of the inner setting jig 32 is aligned with one of the slits 36 of the outer setting jig 33 in the circumferential direction.

Figure 10A:
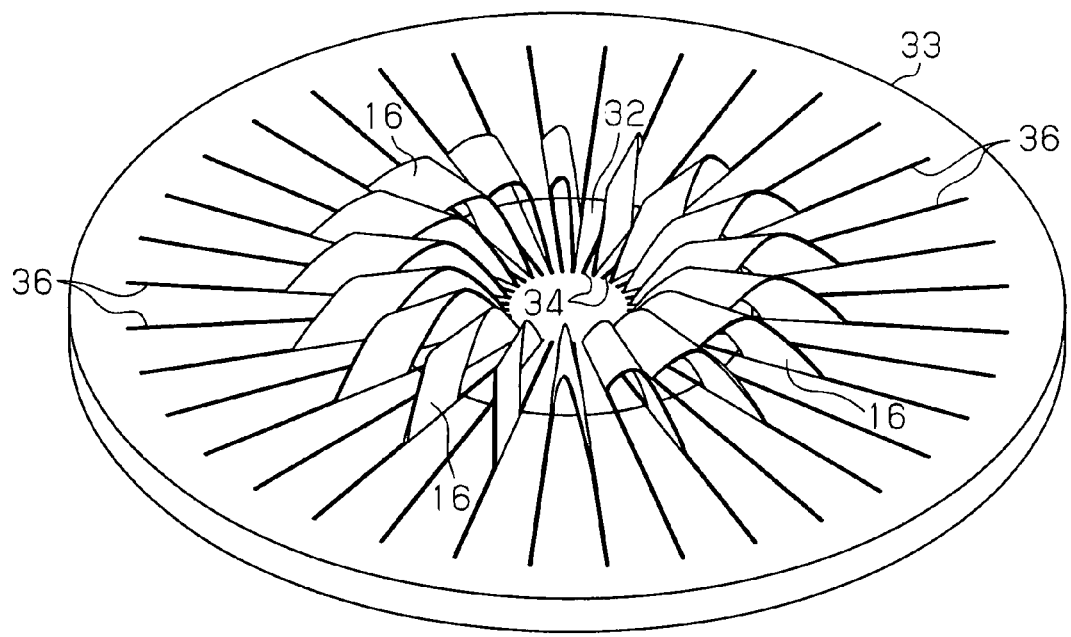
FIG. 10A is a schematic diagram illustrating a state where the second section of each stator coil is inserted in the outer setting jig according to the third embodiment.

Then, as shown in FIG. 10A, the second section of each stator coil 16 is moved from the associated slit 34 toward the slit 36 of the outer setting jig 33 corresponding to the slit 34, and is inserted in the slit 36. In this state, the second section of each stator coil 16 is inserted in one of the slits 36 of the outer setting jig 33, and the first section of each stator coil 16 is inserted in one of the slits 34 of the inner setting jig 32. That is, the stator coils 16 are retained by both the inner setting jig 32 and the outer setting jig 33.

Figure 10B:
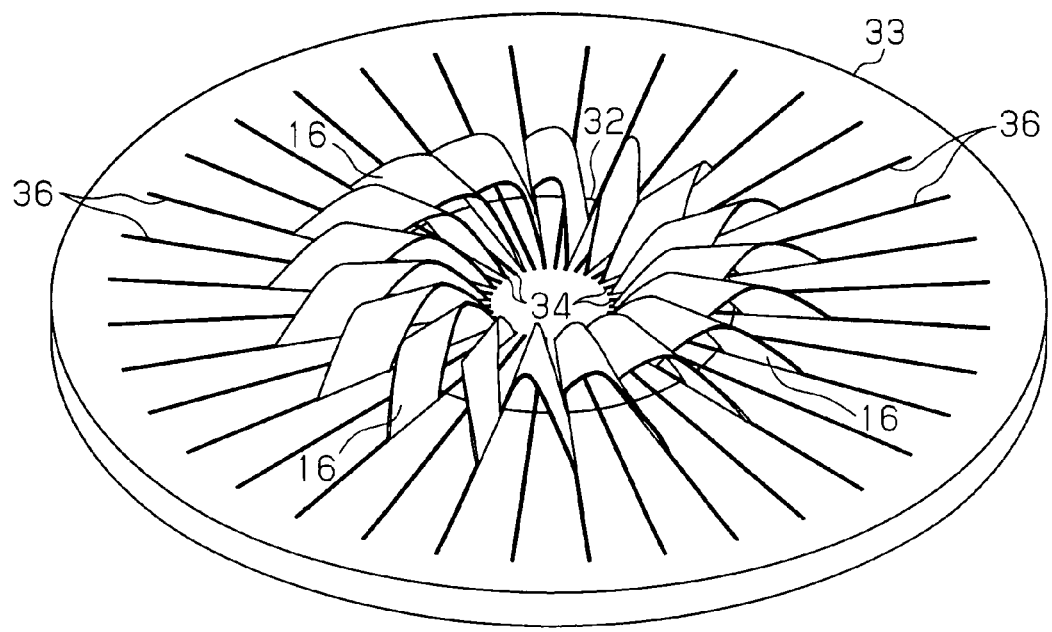
FIG. 10B is a schematic diagram illustrating a state where the inner setting jig is rotated according to the third embodiment.

Subsequently, the inner setting jig 32 is rotated in one direction (clockwise in FIG. 10B) by an amount corresponding to a necessary pitch. FIG. 10B shows a state where the inner setting jig 32 is rotated by one pitch from the state of FIG. 10A. Accordingly, the first section of each stator coil 16 inserted in the associated slit 34 of the inner setting jig 32 is displaced from the second section of each stator coil 16 inserted in the associated slit 36 of the outer setting jig 33 by a pitch corresponding to the rotation. That is, the first section and the second section of each stator coil 16 are displaced from each other in the circumferential direction, and a phase difference (positional displacement) is generated between the first section and the second section. When the inner setting jig 32 is rotated, all the stator coils 16 are simultaneously rotated by the same pitches.

Figure 11A:
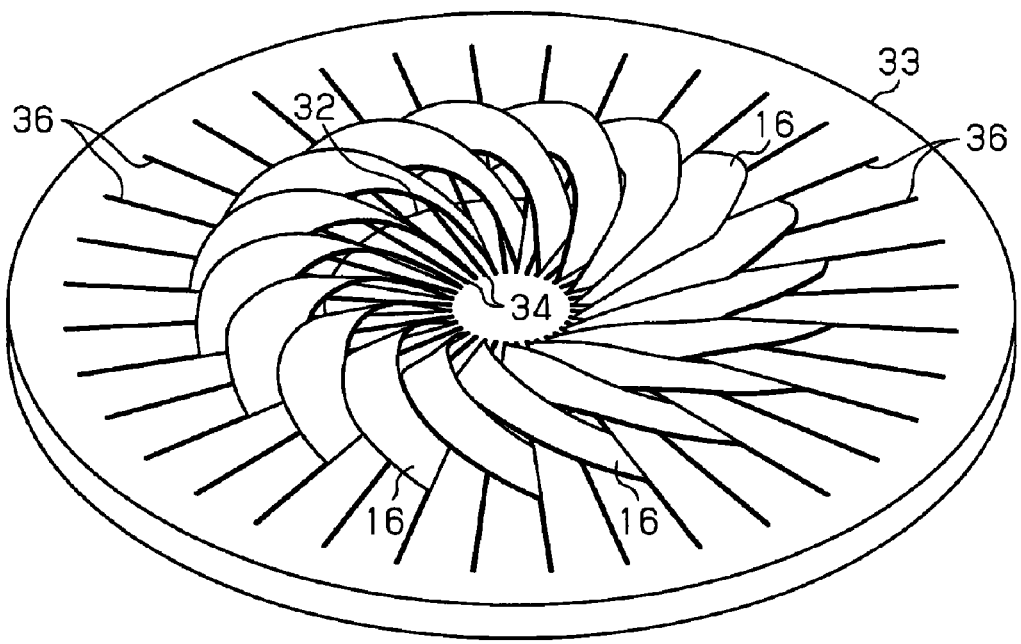
FIG. 11A is a schematic diagram illustrating a state where the inner setting jig is rotated according to the third embodiment.

FIG. 11A shows a state where the inner setting jig 32 is rotated by four pitches. Each stator coil 16 is changed into a state where the first section is displaced from the second section by four pitches from the state before being rotated as shown in FIG. 10A. That is, each stator coil 16 is brought into a state where the first section and the second section are displaced from each other by five pitches, which include the displacement corresponding to one pitch between the first section and the second section when being initially set on the inner setting jig 32.

Figure 11B:
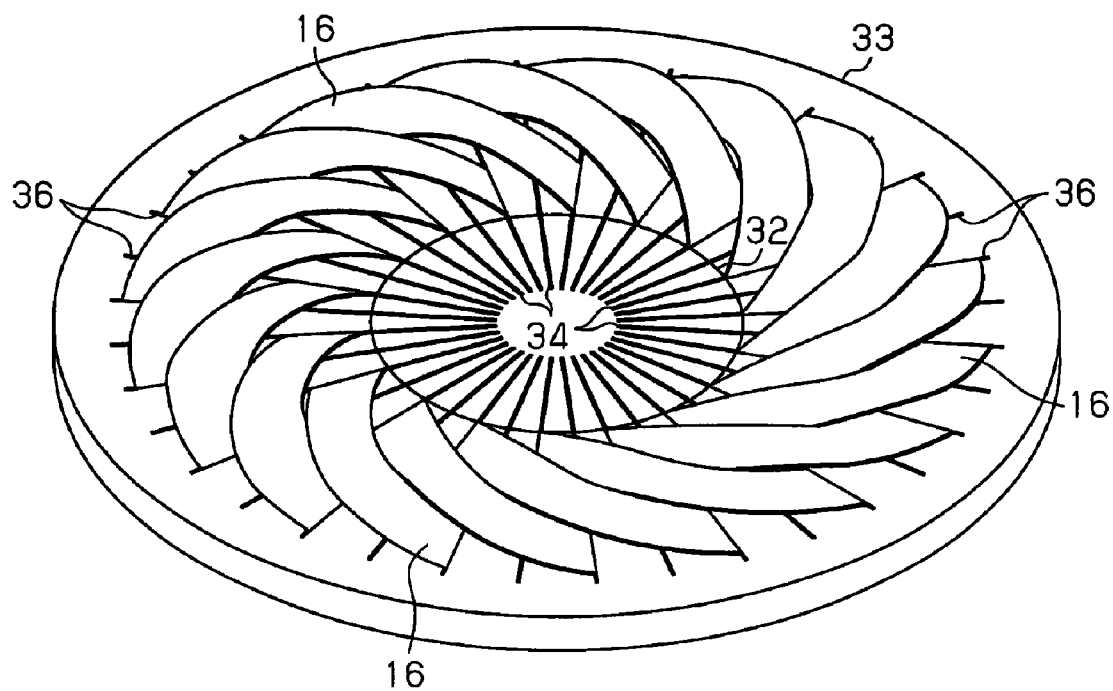
FIG. 11B is a schematic diagram illustrating a state where the first section of each stator coil is inserted in the outer setting jig according to the third embodiment.

Then, as shown in FIG. 11B, the first section of each stator coil 16 inserted in the associated slit 34 of the inner setting jig 32 is moved toward the corresponding slit 36 of the outer setting jig 33, and is inserted in the slit 36. The first section of each stator coil 16 is inserted in the slit 36 of the outer setting jig 33 located at a position displaced by four pitches from the state before being rotated as shown in FIG. 10A.

Figure 12:
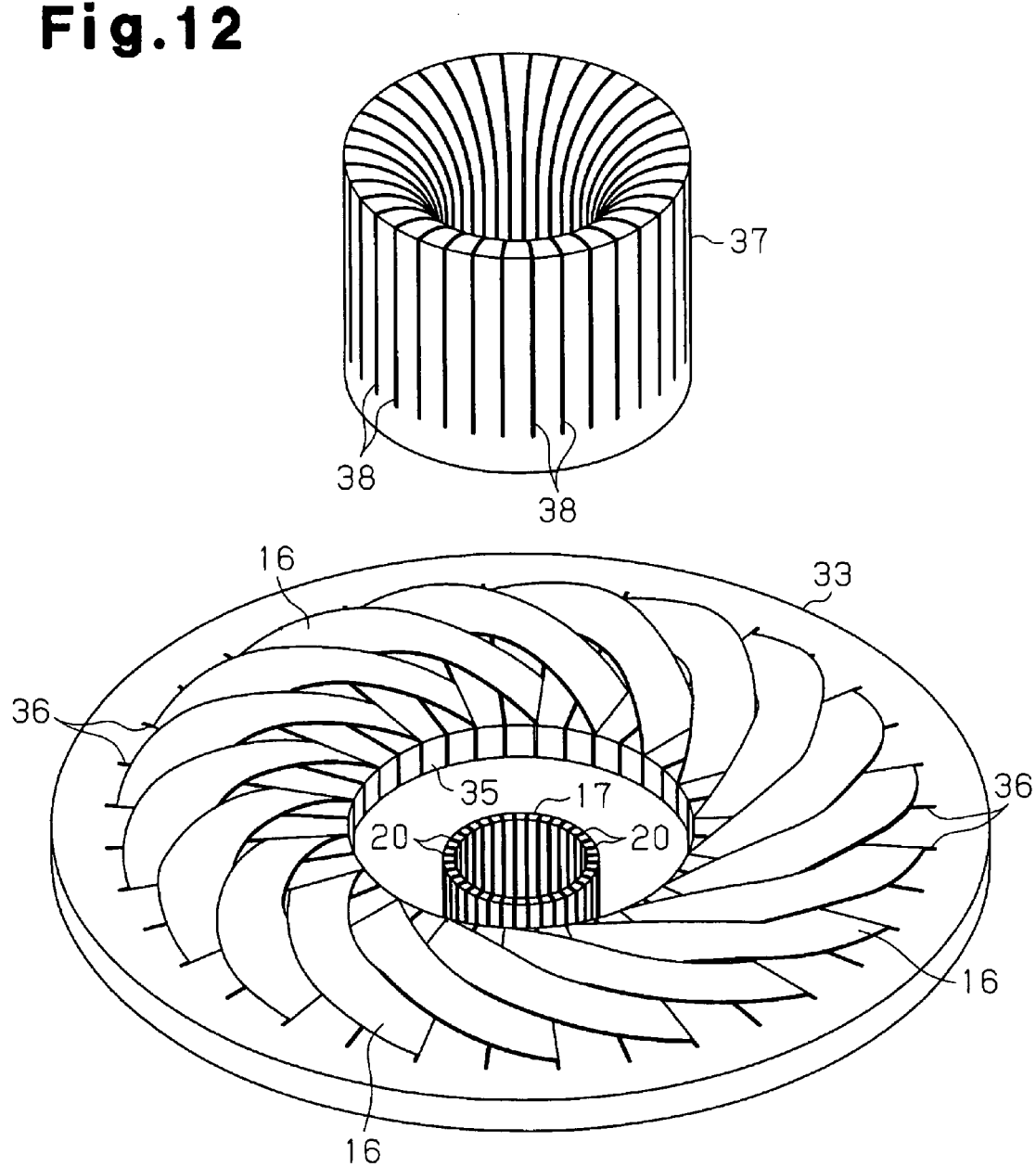
FIG. 12 is a schematic diagram illustrating a state where an insertion jig and the inserting blade are set in the insertion section of the outer setting jig according to the third embodiment.

Thereafter, as shown in FIG. 12, the inner setting jig 32 is removed from the insertion section 35 of the outer setting jig 33. An insertion jig 37 is then fitted to the insertion section 35 of the outer setting jig 33. The insertion jig 37 has a function of guiding the stator coils 16 set on the outer setting jig 33 to the inserting blade 17. The insertion jig 37 is cylindrical and has the circumferential surface in which slits 38 are formed. The slits 38 are arranged at equal pitches in the circumferential direction of the insertion jig 37, and extend in the axial direction of the insertion jig 37. The arrangement pitch of the slits 38 corresponds to the arrangement pitch of the inserting blade 17. The inserting blade 17 is set on the insertion jig 37 fitted to the insertion section 35 of the outer setting jig 33. Each of the slits 20 of the inserting blade 17 is aligned with one of the slits 38 of the insertion jig 37 in the circumferential direction.

Figure 13A:
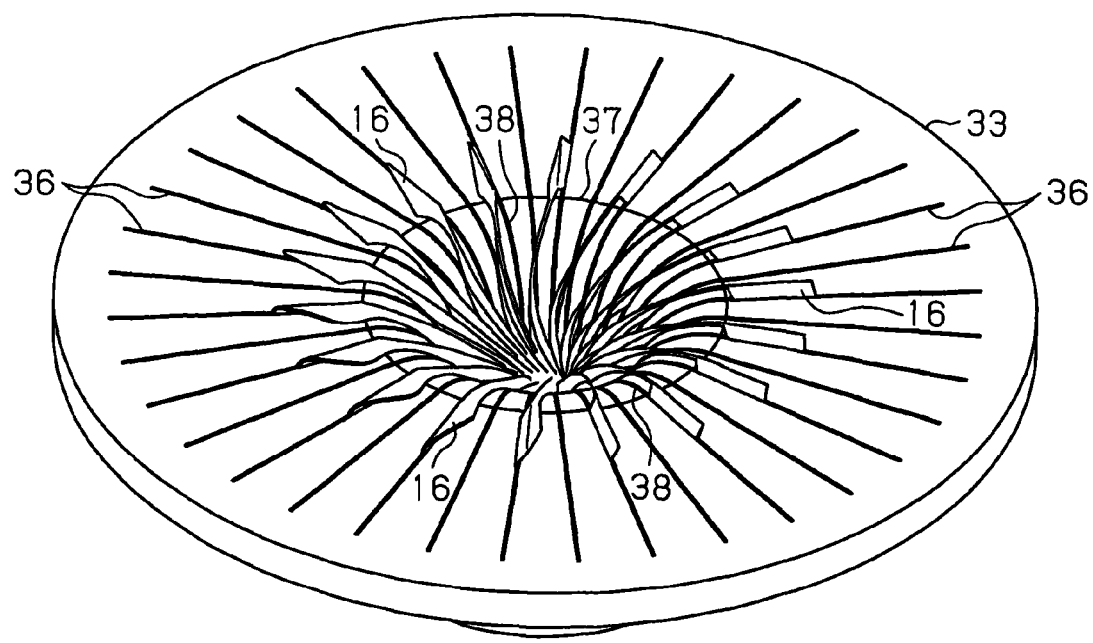
FIG. 13A is a schematic diagram illustrating a state where the stator coils are inserted in the inserting blade using the insertion jig according to the third embodiment.
Figure 13B:
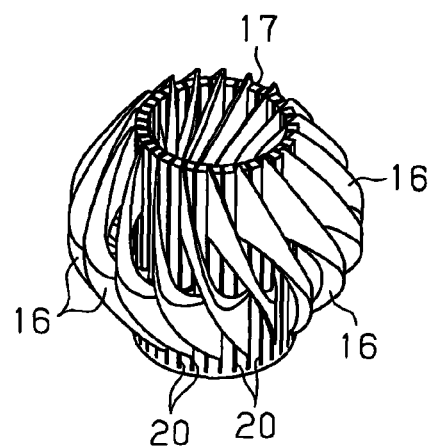
FIG. 13B is a schematic diagram illustrating the inserting blade in which the stator coils are inserted according to the third embodiment.

Subsequently, as shown in FIG. 13A, the stator coils 16 on the outer setting jig 33 are moved toward the slits 38 of the insertion jig 37. Each stator coil 16 is moved toward one of the slits 20 of the inserting blade 17 via one of the slits 38 of the insertion jig 37, and is set on the inserting blade 17 as shown in FIG. 13B. As a result, each stator coil 16 is set on the inserting blade 17 with the first section displaced from the second section by five pitches. The stator coils 16 are arranged to overlap one another to form a spiral shape as a whole in the same manner as when being mounted on the stator core 11. Then, the inserting blade 17 on which the stator coils 16 are mounted is set on the inserter, and each stator coil 16 is inserted in the stator core 11. As a result, as shown in FIG. 1, the stator coils 16 are mounted on the stator core 11 in a state where the stator coils 16 overlap one another to form a spiral shape as a whole. The third embodiment has the same advantages as the advantages (1) to (3) of the first embodiment.

A fourth embodiment will now be described with reference to FIGS. 14 to 17.

In the fourth embodiment, the procedure for setting the stator coils 16 on the inserting blade 17 differs from the first to third embodiments. Therefore, the procedure for setting the stator coils 16 on the inserting blade 17 will mainly be discussed below.

In the procedure shown in FIGS. 14 to 17, an inner setting jig 40, which functions as the intermediate member, and an outer setting jig 41, which functions as the initial member and the final member, are used. The stator coils 16 are twisted by the inner setting jig 40 and the outer setting jig 41, and are finally set on the inserting blade 17.

The inner setting jig 40 is formed into a disk-like shape. Slits 42 are formed in the inner setting jig 40 and extend in a radial pattern. The slits 42 are arranged at equal pitches in the circumferential direction of the inner setting jig 40, and extend radially outward from the center of the inner setting jig 40. The arrangement pitch of the slits 42 corresponds to two pitches of the inserting blade 17. The inner setting jig 40 has an outer diameter, which permits the inserting blade 17 to be fitted on. The outer setting jig 41 is formed into a disk-like shape, and has a circular insertion section 43 at the center. The inserting blade 17 is selectively fitted in the insertion section 43. Slits 44 are formed in the outer setting jig 41 and extend in a radial pattern. The slits 44 are arranged at equal pitches in the circumferential direction of the outer setting jig 41, and extend radially outward from the center of the outer setting jig 33. The arrangement pitch of the slits 44 corresponds to the arrangement pitch of the slits 20 of the inserting blade 17.

Figure 14:
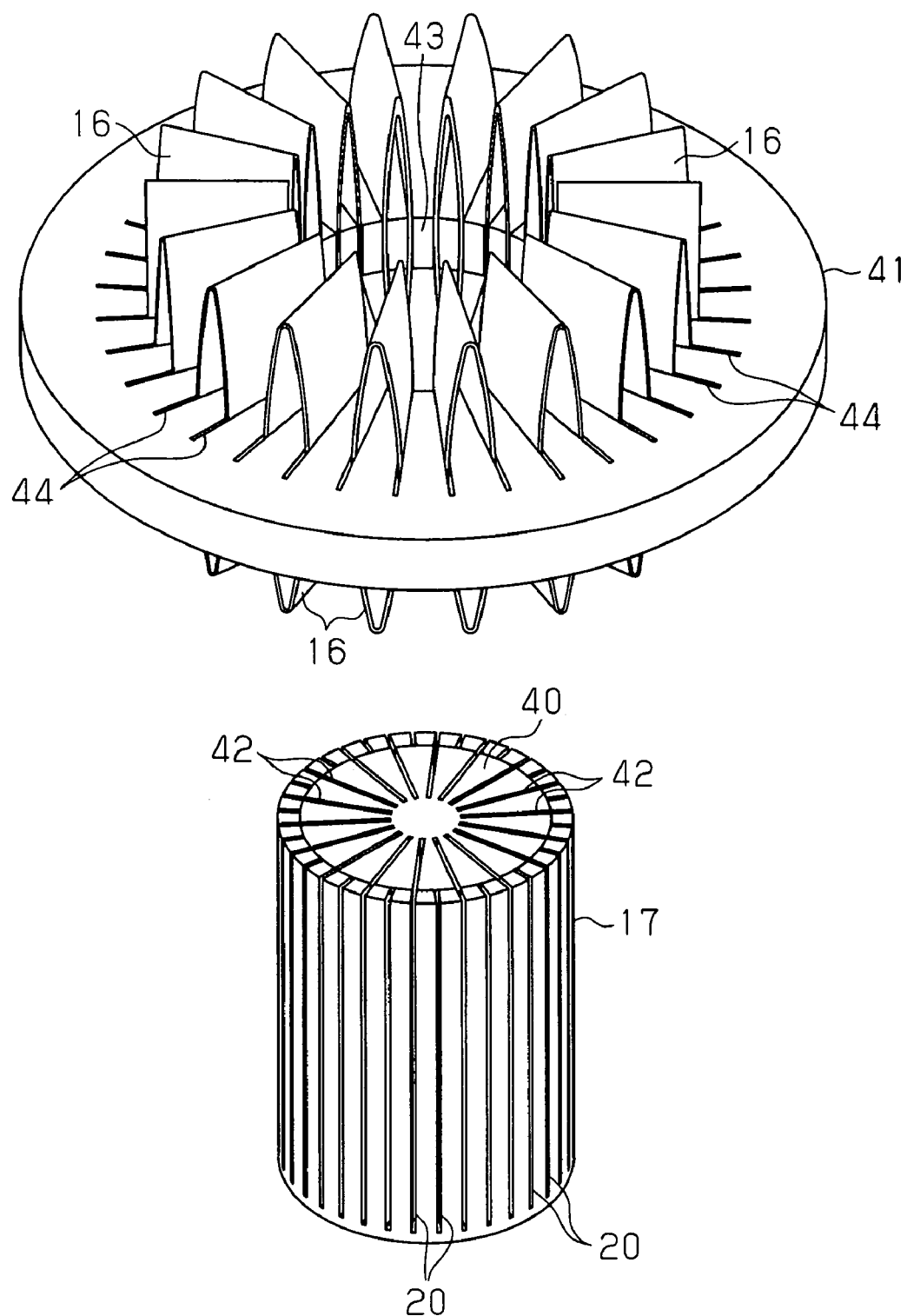
FIG. 14 is a schematic diagram illustrating a state where stator coils are set on an outer setting jig according to a fourth embodiment.

First, the stator coils 16 are set on the outer setting jig 41 as shown in FIG. 14. Each stator coil 16 is set so as to extend over two adjacent slits 44. That is, each stator coil 16 includes a first section, which is inserted in one of the two adjacent slits 44, and a second section, which is inserted in the other slit 44. In this initial setting state, the first section and the second section of each stator coil 16 are displaced from each other in the circumferential direction of the outer setting jig 41 by an amount corresponding to the arrangement pitch of the slits 44. The distance between the adjacent stator coils 16 is equal to the distance between other adjacent stator coils 16. The stator coils 16 are arranged in the circumferential direction of the outer setting jig 41 to extend in a radial pattern.

Figure 15A:
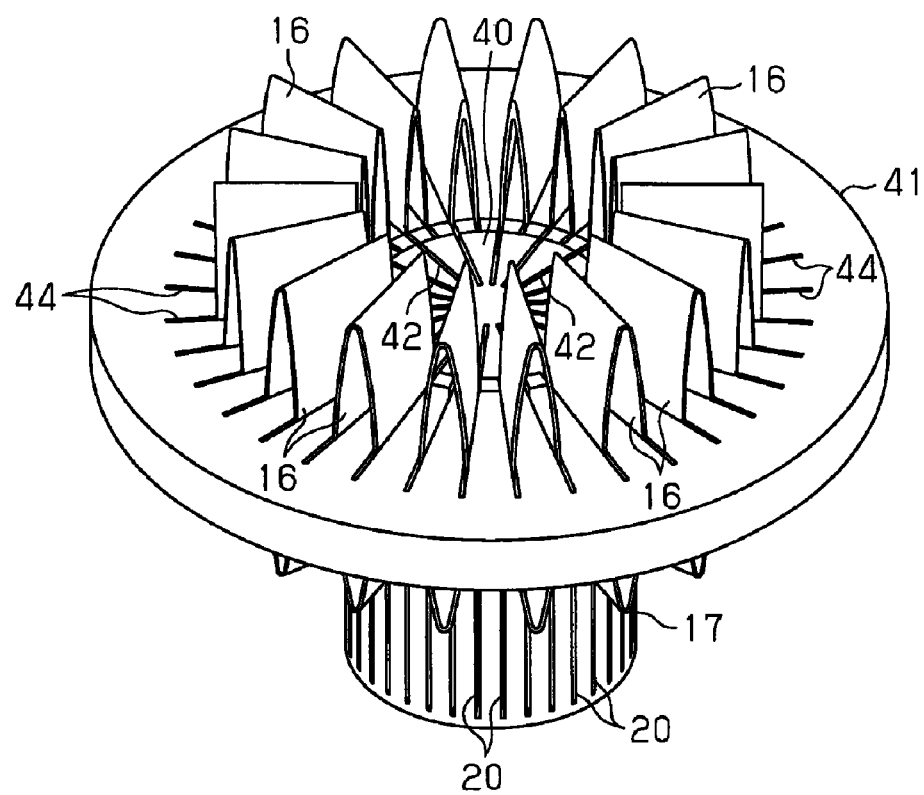
FIG. 15A is a schematic diagram illustrating a state where the inserting blade and an inner setting jig are set in an insertion section of the outer setting jig according to the fourth embodiment.

Subsequently, as shown in FIG. 15A, the inserting blade 17 in which the inner setting jig 40 is fitted is set in the insertion section 43 of the outer setting jig 41. Each of the slits 20 of the inserting blade 17 is aligned with one of the slits 44 of the outer setting jig 41 in the circumferential direction.

Figure 15B:
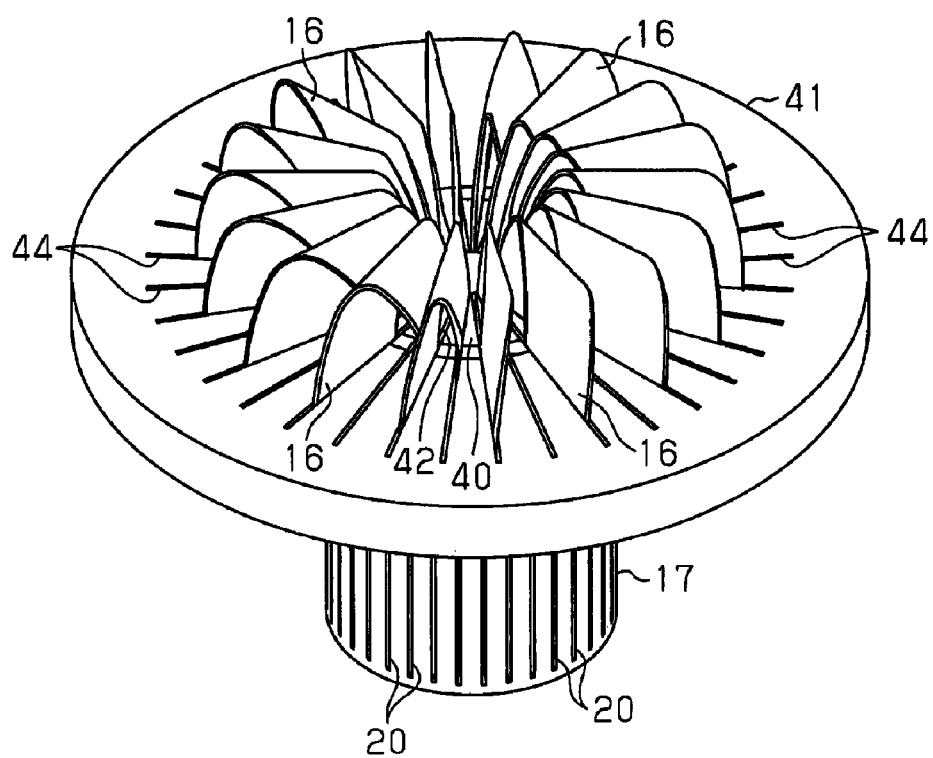
FIG. 15B is a schematic diagram illustrating a state where the second section of each stator coil is inserted in the inner setting jig according to the fourth embodiment.

Then, as shown in FIG. 15B, the second section of each stator coil 16 is moved from the associated slit 44 toward one of the slits 42 of the inner setting jig 40 via one of the slits 20 of the inserting blade 17 corresponding to the slit 44, and is inserted in the slit 42. In this state, the second section of each stator coil 16 is inserted in one of the slits 42 of the inner setting jig 40, and the first section of each stator coil 16 is inserted in one of the slits 44 of the outer setting jig 41. That is, the stator coils 16 are retained by both the inner setting jig 40 and the outer setting jig 41.

Figure 16A:
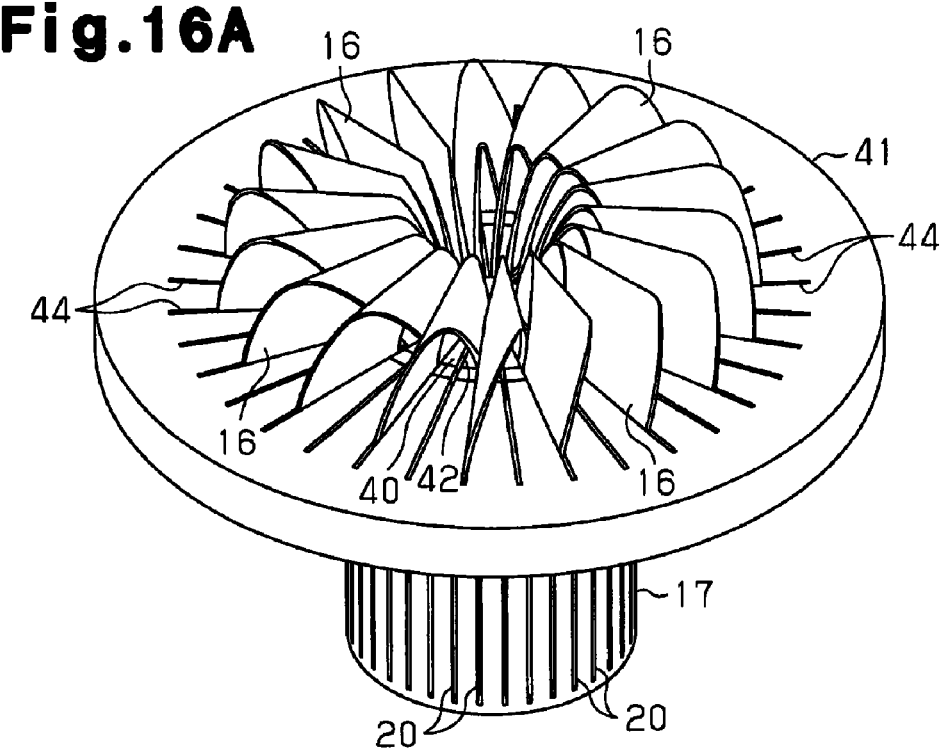
FIG. 16A is a schematic diagram illustrating a state where the inserting blade and the inner setting jig are rotated according to the fourth embodiment.

Subsequently, the inserting blade 17 is rotated in one direction (counterclockwise in FIG. 16A) by an amount corresponding to a necessary pitch together with the inner setting jig 40. FIG. 16A shows a state where the inserting blade 17 and the inner setting jig 40 are rotated by one pitch from the state of FIG. 15B. Accordingly, the second section of each stator coil 16 inserted in the slit 42 of the inner setting jig 40 is displaced from the first section of each stator coil 16 inserted in the slit 44 of the outer setting jig 41 by a pitch corresponding to the rotation. That is, the first section and the second section of each stator coil 16 are displaced from each other in the circumferential direction, and a phase difference (positional displacement) is generated between the first section and the second section. When the inserting blade 17 and the inner setting jig 40 are rotated, all the stator coils 16 are simultaneously rotated by the same pitches.

Figure 16B:
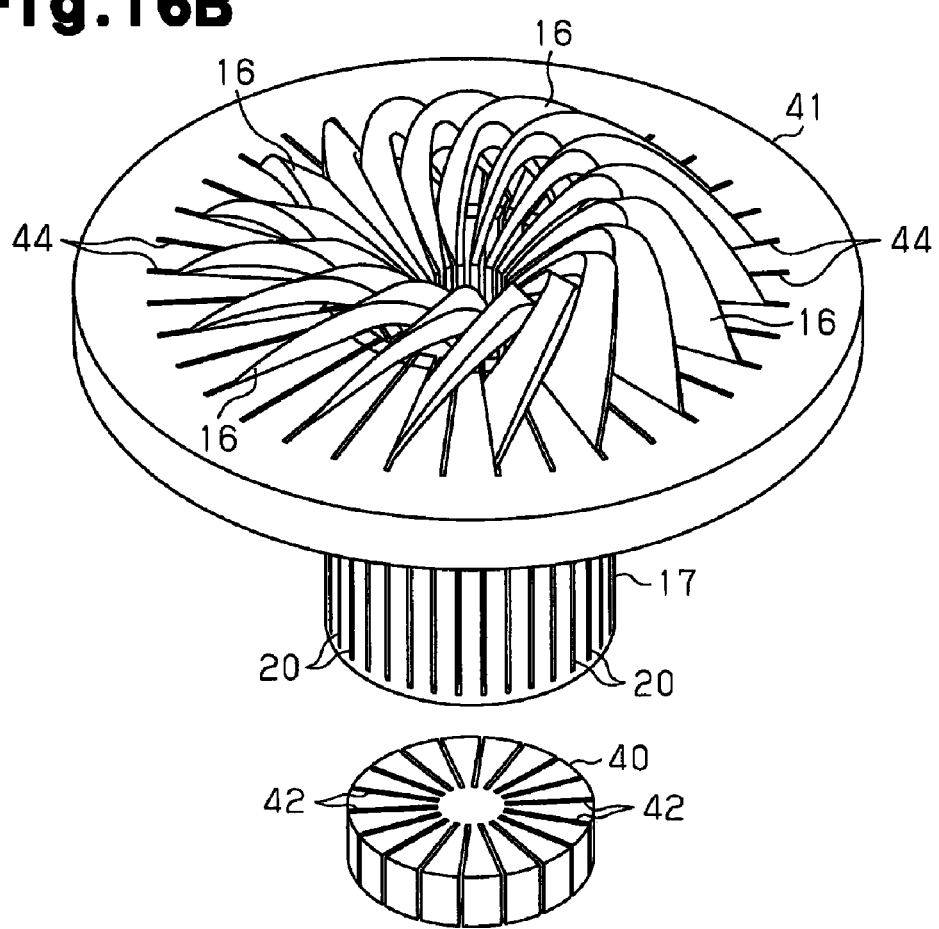
FIG. 16B is a schematic diagram illustrating a state where the inner setting jig is removed from the inserting blade according to the fourth embodiment.

FIG. 16B shows a state where the inserting blade 17 and the inner setting jig 40 are rotated by four pitches. Each stator coil 16 is changed into a state where the second section is displaced from the first section by four pitches from the state before being rotated as shown in FIG. 15B. That is, each stator coil 16 is brought into a state where the first section and the second section are displaced from each other by five pitches, which include the displacement corresponding to one pitch between the first section and the second section when being initially set on the outer setting jig 41. Then, as shown in FIG. 16B, the inner setting jig 40 is removed from the inserting blade 17.

Then, the first section of each stator coil 16 inserted in the associated slit 44 of the outer setting jig 41 is moved toward the corresponding slit 20 of the inserting blade 17, and is inserted in the slit 20. The first section of each stator coil 16 is inserted in the slit 20 of the inserting blade 17 located at a position displaced by four pitches from the state before being rotated as shown in FIG. 15B.

Figure 17:
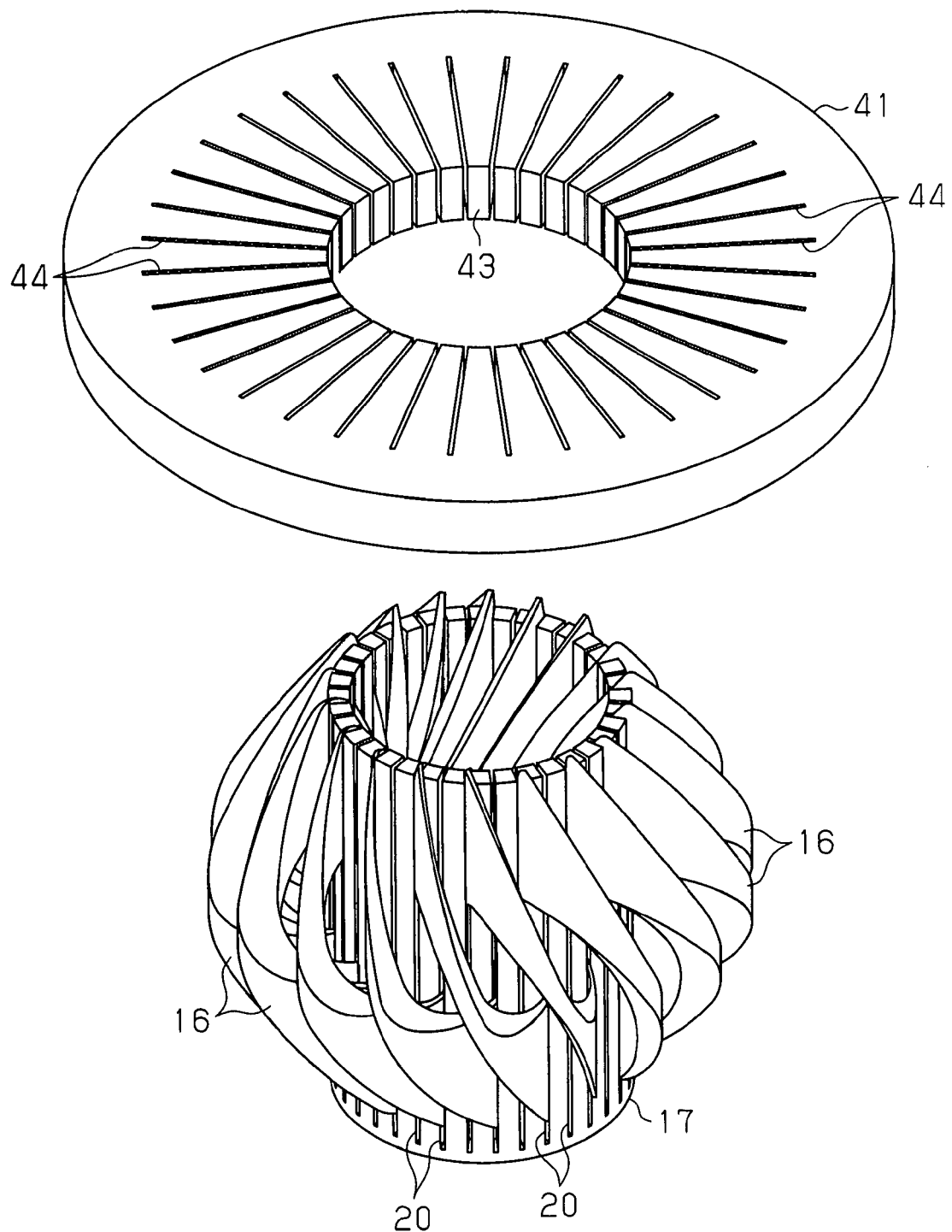
FIG. 17 is a schematic diagram illustrating a state where the outer setting jig is removed from the inserting blade after inserting the first section of each stator coil in the inserting blade.

Thereafter, as shown in FIG. 17, the inserting blade 17 is removed from the insertion section 43 of the outer setting jig 41. As a result, each stator coil 16 is set on the inserting blade 17 with the second section displaced from the first section by five pitches. The stator coils 16 are arranged to overlap one another to form a spiral shape as a whole in the same manner as when being mounted on the stator core 11. Then, the inserting blade 17 on which the stator coils 16 are mounted is set on the inserter, and each stator coil 16 is inserted in the stator core 11. As a result, as shown in FIG. 1, the stator coils 16 are mounted on the stator core 11 in a state where the stator coils 16 overlap one another to form a spiral shape as a whole. The fourth embodiment has the same advantages as the advantages (1) to (3) of the first embodiment.

A fifth embodiment will now be described with reference to FIGS. 18A to 21.

In the fifth embodiment, the procedure for setting the stator coils 16 on the inserting blade 50 differs from the first to fourth embodiments. Therefore, the procedure for setting the stator coils 16 on the inserting blade 50 will mainly be discussed below.

In the procedure shown in FIGS. 18A to 21, an inserting blade 50, which functions as the initial member and the final member, and a setting jig 51, which functions as the intermediate member, are used. The stator coils 16 are twisted by the inserting blade 50 and the setting jig 51, and are finally set on the inserting blade 50.

The inserting blade 50 is formed into a cylindrical shape, and has a circumferential surface in which long slits 52 and short slits 53 are formed. The long slits 52 are arranged at equal pitches in the circumferential direction of the inserting blade 50 and extend in the axial direction of the inserting blade 50. The arrangement pitch of the long slits 52 corresponds to the arrangement pitch of the teeth 12 of the stator core 11. The short slits 53 are arranged at equal pitches in the circumferential direction of the inserting blade 50, and extend in the axial direction of the inserting blade 50. The arrangement pitch of the short slits 53 corresponds to the arrangement pitch of the teeth 12 of the stator core 11. The long slits 52 and the short slits 53 are alternately arranged in the circumferential surface of the inserting blade 50, and are displaced from one another by half a pitch. That is, the distance between the adjacent long slit 52 and the short slit 53 corresponds to half the arrangement pitch of the long slits 52 or the short slits 53. The length of the long slits 52 is substantially the same as the length of the inserting blade 50, and the length of the short slits 53 is much shorter than that of the long slits 52. The structure of the setting jig 51 is identical to that of the setting blade 18 of the first embodiment, and the setting jig 51 has a circumferential surface in which the slits 54 are formed.

Figure 18A:
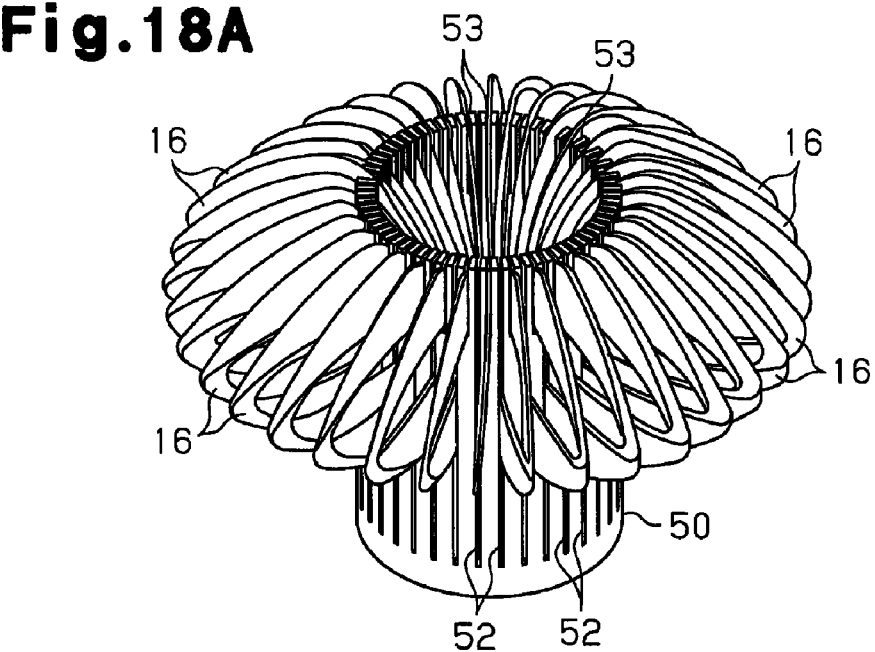
FIG. 18A is a schematic diagram illustrating a state where stator coils are set on an inserting blade according to a fifth embodiment.

First, the stator coils 16 are set on the inserting blade 50 as shown in FIG. 18A. Each stator coil 16 is set on the inserting blade 50 so as to extend over the adjacent long slit 52 and the short slit 53. That is, each stator coil 16 includes a first section, which is inserted in one of the long slits 52, and a second section, which is inserted in the short slit 53 that is adjacent to that long slit 52. In this initial setting state, the first section and the second section of each stator coil 16 are displaced from each other by half a pitch in the circumferential direction of the inserting blade 50, and are also displaced in the axial direction. The distance between the adjacent stator coils 16 is equal to the distance between other adjacent stator coils 16. The stator coils 16 are arranged in the circumferential direction of the inserting blade 50 to extend in a radial pattern.

Figure 18B:
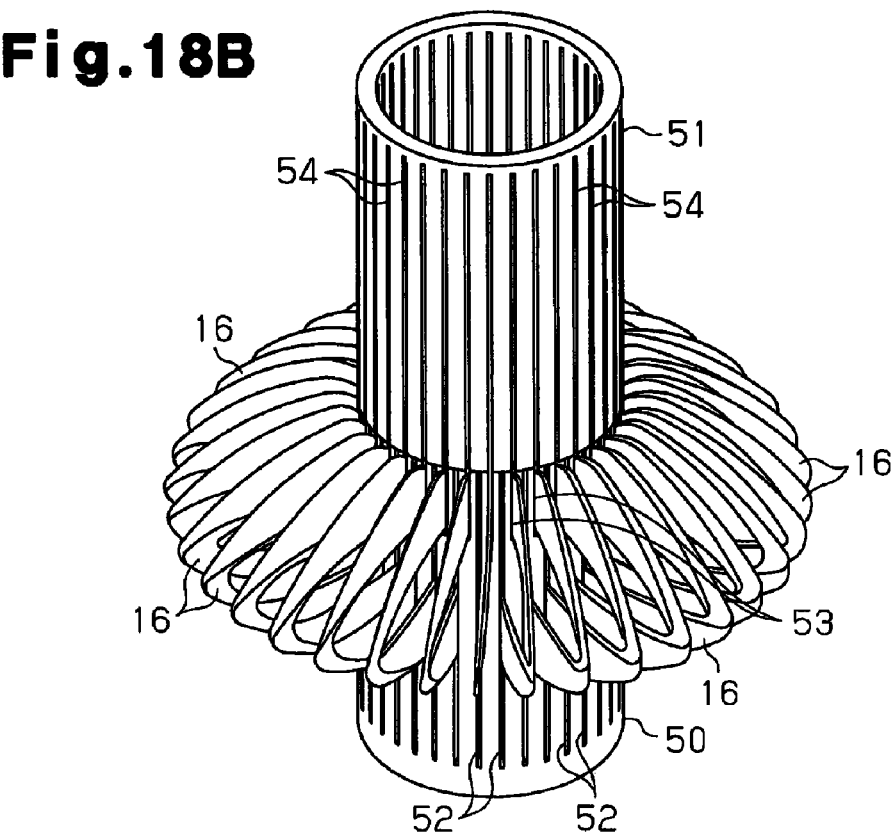
FIG. 18B is a schematic diagram illustrating a state where a setting jig is mounted on the inserting blade according to the fifth embodiment.

Subsequently, as shown in FIG. 18B, the setting jig 51 is arranged on the inserting blade 50 on which the stator coils 16 are set. Each of the slits 54 of the setting jig 51 is aligned with one of the short slits 53 in which the second section of the stator coil 16 is inserted in the circumferential direction.

Figure 19A:
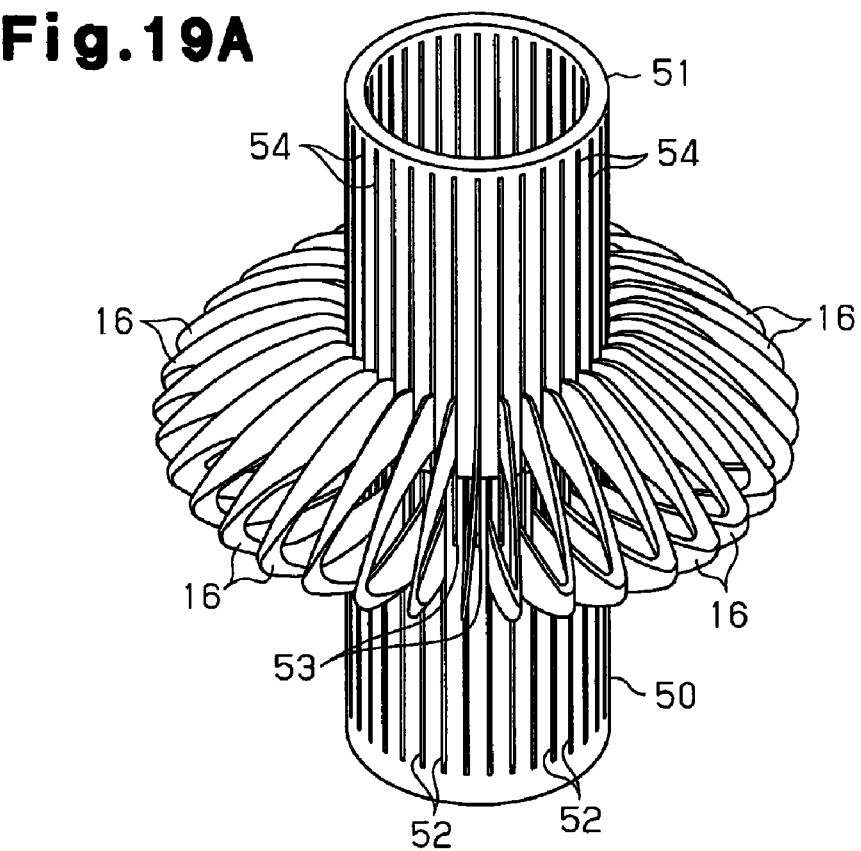
FIG. 19A is a schematic diagram illustrating a state where the second section of each stator coil is inserted in the setting jig according to the fifth embodiment.

Then, as shown in FIG. 19A, the second section of each stator coil 16 (a portion inserted in the short slit 53) is moved from the associated short slit 53 toward the slit 54 of the setting jig 51 corresponding to the short slit 53, and is inserted in the slit 54. In this state, the first section of each stator coil 16 is inserted in one of the long slits 52 of the inserting blade 50, and the second section of each stator coil 16 is inserted in one of the slits 54 of the setting jig 51. That is, the stator coils 16 are retained by both the inserting blade 50 and the setting jig 51.

Figure 19B:
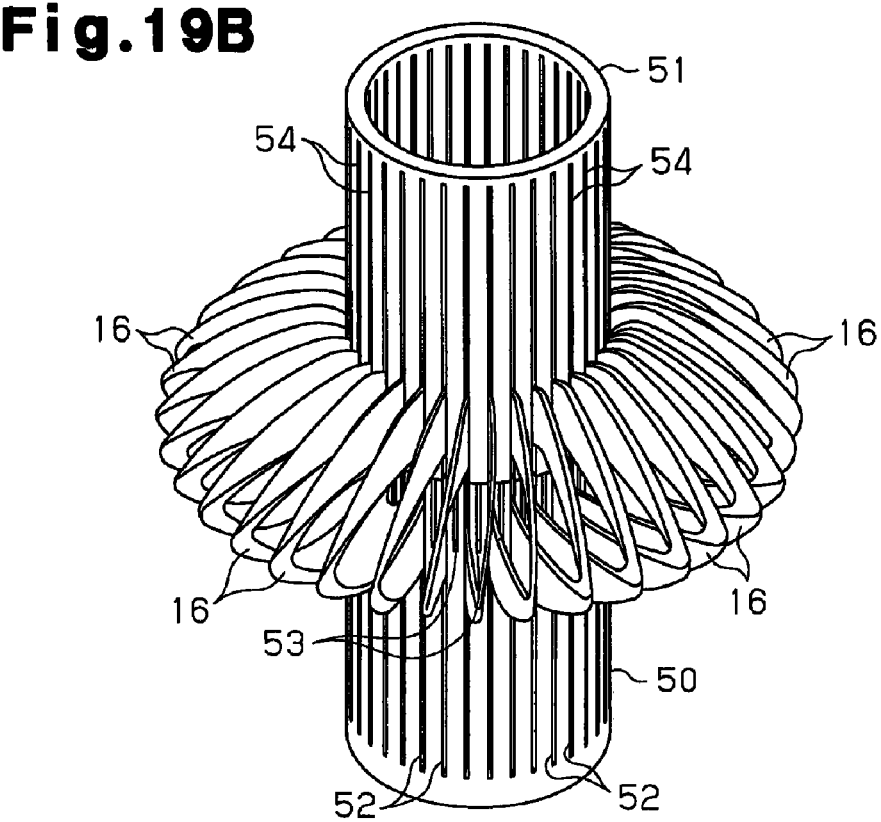
FIG. 19B is a schematic diagram illustrating a state where the setting jig is rotated according to the fifth embodiment.

Subsequently, the setting jig 51 is rotated in one direction (counterclockwise in FIG. 19B) by an amount corresponding to a necessary pitch. FIG. 19B shows a state where the setting jig 51 is rotated by half a pitch from the state of FIG. 19A. Accordingly, the second section of each stator coil 16 inserted in the associated slit 54 of the setting jig 51 is displaced from the first section of the stator coil 16 inserted in the associated long slit 52 of the inserting blade 50 by a pitch corresponding to the rotation. That is, the first section and the second section of each stator coil 16 are displaced from each other in the circumferential direction, and a phase difference (positional displacement) is generated between the first section and the second section. When the setting jig 51 is rotated, all the stator coils 16 are simultaneously rotated by the same pitches.

Figure 20A:
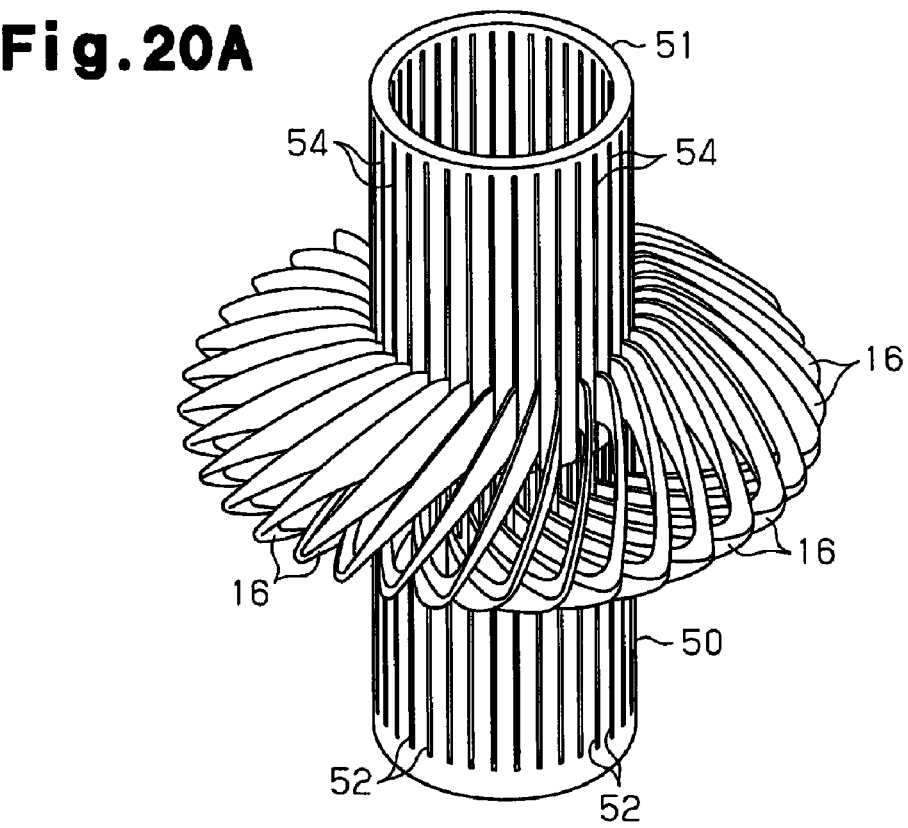
FIG. 20A is a schematic diagram illustrating a state where the setting jig is rotated according to the fifth embodiment.
Figure 20B:
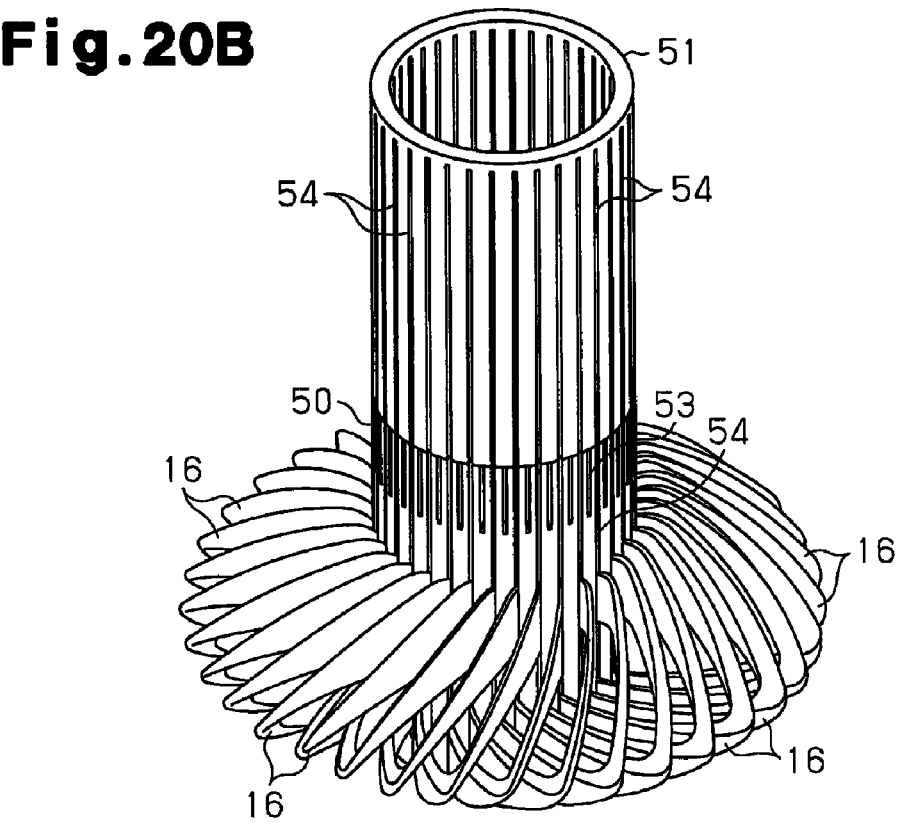
FIG. 20B is a schematic diagram illustrating a state where the second section of each stator coil is inserted in the inserting blade according to the fifth embodiment.

FIG. 20B shows a state where the setting jig 51 is rotated by 4.5 pitches. Each stator coil 16 is changed into the state where the second section is displaced from the first section by 4.5 pitches from the state before being rotated as shown in FIG. 19A. That is, each stator coil 16 is brought into a state where the first section and the second section are displaced from each other by five pitches, which include the displacement corresponding to 0.5 pitch between the first section and the second section when being initially set on the inserting blade 50.

Then, as shown in FIG. 20B, the second section of each stator coil 16 inserted in the associated slit 54 of the setting jig 51 is moved toward the corresponding long slit 52 of the inserting blade 50, and is inserted in the long slit 52. The second section of each stator coil 16 is inserted in the long slit 52 of the inserting blade 50 located at a position displaced by 4.5 pitches from the state before being rotated as shown in FIG. 19A.

Figure 21:
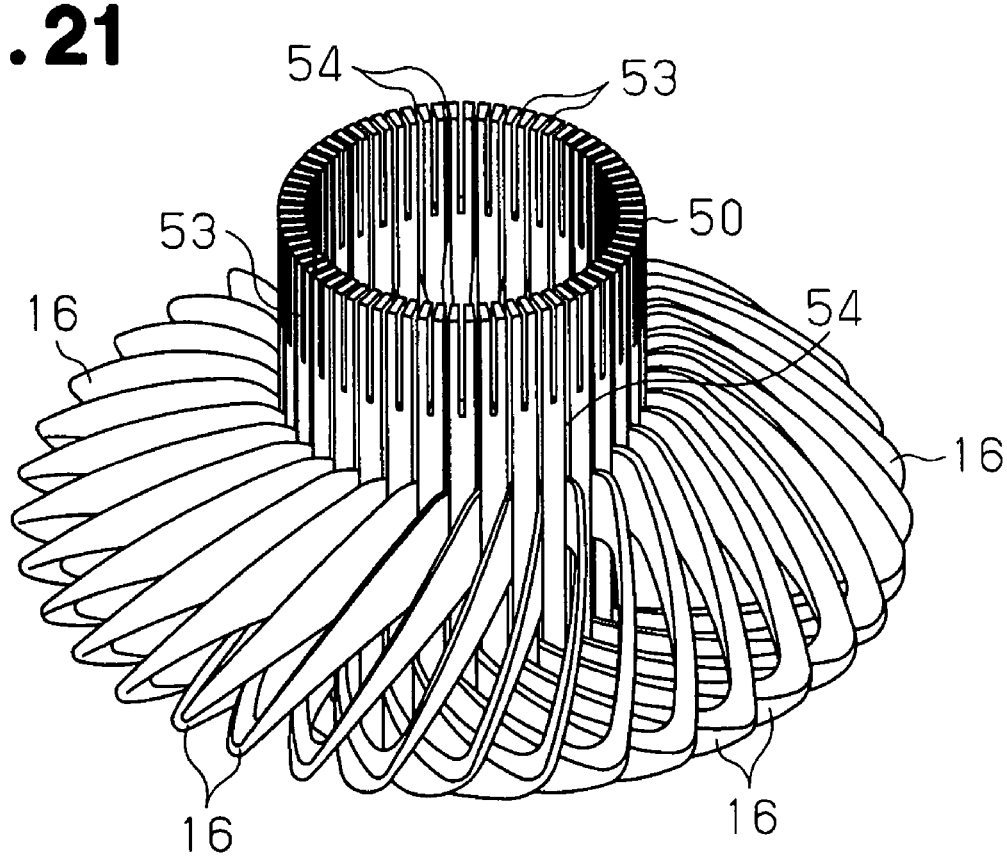
FIG. 21 is a schematic diagram illustrating a state where the setting jig is removed from the inserting blade according to the fifth embodiment.

Thereafter, as shown in FIG. 21, the setting jig 51 is removed from the inserting blade 50. As a result, each stator coil 16 is set on the inserting blade 50 with the second section displaced from the first section by five pitches. The stator coils 16 are arranged to overlap one another to form a spiral shape as a whole in the same manner as when being mounted on the stator core 11. Then, the inserting blade 17 on which the stator coils 16 are mounted is set on the inserter, and each stator coil 16 is inserted in the stator core 11. As a result, as shown in FIG. 1, the stator coils 16 are mounted on the stator core 11 in a state where the stator coils 16 overlap one another to form a spiral shape as a whole.

The fifth embodiment has the following advantage in addition to the advantages (1) to (4) of the first embodiment.

(5) The long slits 52 and the short slits 53 are formed in the inserting blade 50. Therefore, the stator coils 16 are easily displaced in the axial direction of the inserting blade 50 before setting the stator coils 16 on the inserting blade 50. By displacing the stator coils 16 as described above, the stator coils 16 are smoothly moved to the setting jig 51.

The above embodiments may be modified as follows.

In each of the embodiments, part of each stator coil 16 that is moved after the initial setting may be either the first section or the second section. However, it is necessary that the same one of the first section and the second section of each stator coil 16 be moved.

In each of the embodiments, at the initial setting, both the first section and the second section of each stator coil may be inserted in one of the slits, and one of the first section and the second section may be moved.

In each of the embodiments, the member to be rotated may be changed. For example, in the second embodiment, the setting jig 30 may be rotated.

In the second, third, and fourth embodiments, the first section and the second section of each stator coil may be initially set as in the first and fifth embodiments such that the first section and the second section are displaced from each other in a direction in which the slits extend.

In each of the embodiments, the number of the pitches to be rotated may be changed. The number of the pitches to be rotated is determined in accordance with the specification of the rotating electrical machine as described above.

In each of the embodiments, the number of the stator coils 16 to be set on the inserting blade 17(50) may be changed. The number of the stator coils 16 is also determined in accordance with the specification of the rotating electrical machine.

In each of the embodiments, the inserting blade 17(50) and the setting jig, which can be inserted in the inner circumferential surface of the inserting blade 17(50), may be used. In this case, the stator coils 16 are moved between the inserting blade 17(50) and the setting jig, and rotated in the circumferential direction of the inserting blade 17(50), and are finally set on the inserting blade 17(50).

In the fifth embodiment, only the long slits 52 may be formed in the inserting blade 50, and the stator coils 16 may be initially set as described in the fifth embodiment.

In each of the embodiments, the initial setting state of the stator coils 16 may be changed as follows. In the first embodiment, the state shown in FIG. 2B may be referred to as the initial setting state. In the second embodiment, the state shown in FIG. 6B may be referred to as the initial setting state. In the third embodiment, the state shown in FIG. 10A may be referred to as the initial setting state. In the fourth embodiment, the state shown in FIG. 15B may be referred to as the initial setting state. In the fifth embodiment, the state shown in FIG. 19A may be referred to as the initial setting state. That is, each stator coil 16 may extend over two members at the initial setting.

The present examples and embodiments are to be considered as illustrative and not restrictive and the invention is not to be limited to the details given herein, but may be modified within the scope and equivalence of the appended claims.

What is claimed is:

1. A method for setting a plurality of stator coils on an inserting blade before mounting the stator coils on a stator core using the inserting blade such that the stator coils overlap one another to form a spiral shape, the method comprising:
   retaining a first section and a second section of each stator coil by a first member such that the stator coils are arranged about the axis at equal intervals to extend in a radial pattern;
   moving the second section of each stator coil from the first member to the second member so as to retain the stator coils by the first member and the second member;
   rotating the first member or the second member about the axis to generate a phase difference between the first section and the second section of each stator coil; and
   setting the stator coils on the inserting blade while maintaining the phase difference between the first section and the second section.

2. The method according to claim 1, wherein each of the stator coils mounted on the stator core overlap other stator coils, and the rotating amount of the first member or the second member is determined in accordance with the number of other stator coils that overlap each stator coil.

3. The method according to claim 1, wherein the first member is the inserting blade, the method further comprising:
   retaining the first section and the second section of each stator coil by the inserting blade such that the stator coils are arranged about the axis at equal intervals to extend in a radial pattern;
   moving the second section of each stator coil from the inserting blade to the second member so as to retain the stator coils by the inserting blade and the second member; and
   restoring, after rotating the inserting blade or the second member about the axis, the second section from the second member to the inserting blade so as to set the stator coils on the inserting blade while maintaining the phase difference between the first section and the second section.

4. The method according to claim 1, wherein the second member is the inserting blade, the method further comprising:
   retaining the first section and the second section of each stator coil by the first member such that the stator coils are arranged about the axis at equal intervals to extend in a radial pattern;
   moving the second section of each stator coil from the first member to the inserting blade so as to retain the stator coils by the first member and the inserting blade; and
   moving, after rotating the first member or the inserting blade about the axis, the first section from the first member to the inserting blade so as to set the stator coils on the inserting blade while maintaining the phase difference between the first section and the second section.

5. A method for manufacturing a rotating electrical machine, which includes a stator core on which a plurality of stator coils are mounted in a state where the stator coils overlap one another to form a spiral shape as a whole, the method comprising:
   retaining a first section and a second section of each stator coil by a first member such that the stator coils are arranged about the axis at equal intervals to extend in a radial pattern;
   moving the second section of each stator coil from the first member to the second member so as to retain the stator coils by the first member and the second member;
   rotating the first member or the second member about the axis to generate a phase difference between the first section and the second section of each stator coil;
   setting the stator coils on the inserting blade while maintaining the phase difference between the first section and the second section; and
   inserting the stator coils set on the inserting blade in slots formed in the stator.

* * * * *